United States Patent
Lee et al.

(10) Patent No.: US 11,005,276 B2
(45) Date of Patent: May 11, 2021

(54) STACKED VARIABLE VOLTAGE BATTERY MODULE ARRANGEMENT

(71) Applicant: Solsona Enterprise, LLC, San Diego, CA (US)

(72) Inventors: Chong Uk Lee, Carlsbad, CA (US); Edward A. Krause, Kelowna (CA)

(73) Assignee: Solsona Enterprise, LLC, San Diego, CA (US)

( * ) Notice: Subject to any disclaimer, the term of this patent is extended or adjusted under 35 U.S.C. 154(b) by 200 days.

(21) Appl. No.: 16/252,855

(22) Filed: Jan. 21, 2019

(65) Prior Publication Data
US 2019/0229540 A1    Jul. 25, 2019

Related U.S. Application Data

(60) Provisional application No. 62/620,739, filed on Jan. 23, 2018.

(51) Int. Cl.
*H02J 7/00* (2006.01)
*H01M 10/42* (2006.01)

(52) U.S. Cl.
CPC ......... *H02J 7/0024* (2013.01); *H01M 10/425* (2013.01); *H01M 2010/4271* (2013.01)

(58) Field of Classification Search
CPC ...... H02J 7/0024; H01M 10/425; B60L 58/22
See application file for complete search history.

(56) References Cited

U.S. PATENT DOCUMENTS

| | | | |
|---|---|---|---|
| 3,923,116 A | 12/1975 | Thompson et al. |
| 4,142,135 A | 2/1979 | Fujita |
| 4,313,080 A | 1/1982 | Park |
| 4,894,764 A | 1/1990 | Meyer et al. |
| 4,916,329 A | 4/1990 | Dang et al. |
| 5,341,075 A | 8/1994 | Cocconi |
| 5,773,962 A | 6/1998 | Nor |
| 5,965,996 A | 10/1999 | Arledge et al. |
| 6,047,787 A | 4/2000 | Deng et al. |

(Continued)

FOREIGN PATENT DOCUMENTS

| | | |
|---|---|---|
| CN | 101895155 | 11/2010 |
| CN | 101964523 | 2/2011 |

(Continued)

*Primary Examiner* — Richard V Muralidar
(74) *Attorney, Agent, or Firm* — Lipsitz & McAllister, LLC

(57) ABSTRACT

The present invention comprises a reconfigurable variable voltage battery. One or more variable voltage battery (VVB) modules are connected in series to form a stacked variable voltage battery (SVVB or Stacked VVB). A variable voltage battery module may comprise at least one battery cell and processor controlled switches adapted to vary the output of the variable voltage battery module. By separately configuring the switches of each VVB module, the output of the stacked VVB module can produce any voltage up to the full sum of the voltages of all the cells in the individual VVB modules. In addition, charge balancing can easily be achieved with a stacked VVB configuration, as some VVB modules can be bypassed (e.g., by setting select switches to simulate a short condition) either to prioritize the discharging of stronger VVB modules, or to prioritize the charging of weaker VVB modules.

21 Claims, 26 Drawing Sheets

(56) References Cited

U.S. PATENT DOCUMENTS

| | | | |
|---|---|---|---|
| 6,104,165 | A | 8/2000 | Miyamoto et al. |
| 6,230,496 | B1 | 5/2001 | Hofmann et al. |
| 6,255,826 | B1 | 7/2001 | Ohsawa et al. |
| 6,430,692 | B2 | 8/2002 | Kimble et al. |
| 6,441,581 | B1 | 8/2002 | King et al. |
| 6,462,510 | B1 | 10/2002 | Takada et al. |
| 6,627,345 | B1 | 9/2003 | Zemlok et al. |
| 6,646,442 | B2 | 11/2003 | Katoh |
| 6,882,129 | B2 | 4/2005 | Boskovitch et al. |
| 6,909,959 | B2 | 6/2005 | Hallowell |
| 6,977,482 | B2 | 12/2005 | Popescu-Stanesti et al. |
| 7,005,830 | B2 | 2/2006 | Moore et al. |
| 7,075,194 | B2 | 7/2006 | Weidenheimer et al. |
| 7,138,775 | B2 | 11/2006 | Sugimoto et al. |
| 7,208,894 | B1 | 4/2007 | Earle |
| 7,242,159 | B2 | 7/2007 | Ishikawa et al. |
| 7,456,521 | B2 | 11/2008 | Weidenheimer et al. |
| 7,893,561 | B2 | 2/2011 | Weidenheimer et al. |
| 8,106,542 | B2 | 1/2012 | Lai |
| 8,816,613 | B2 * | 8/2014 | Lee .................. B60L 58/19 |
| | | | 318/140 |
| 8,957,610 | B2 * | 2/2015 | Lee .................. B60L 58/21 |
| | | | 318/139 |
| 2001/0035696 | A1 | 11/2001 | Knowles et al. |
| 2003/0071523 | A1 | 4/2003 | Silverman |
| 2005/0206331 | A1 | 9/2005 | Donnelly |
| 2006/0076171 | A1 | 4/2006 | Donnelly et al. |
| 2007/0052295 | A1 | 3/2007 | Frucht |
| 2007/0062744 | A1 | 3/2007 | Weidenheimer et al. |
| 2007/0080662 | A1 | 4/2007 | Wu |
| 2009/0160247 | A1 | 6/2009 | Nakamura et al. |
| 2011/0001442 | A1 | 1/2011 | Lee et al. |
| 2011/0018352 | A1 | 1/2011 | Lai |
| 2012/0256568 | A1 * | 10/2012 | Lee .................. B60L 15/007 |
| | | | 318/139 |
| 2013/0049677 | A1 | 2/2013 | Bouman |

FOREIGN PATENT DOCUMENTS

| | | |
|---|---|---|
| WO | 0032917 | 6/2000 |
| WO | 2011002482 | 1/2011 |
| WO | 2011025937 | 3/2011 |
| WO | 2011108925 | 9/2011 |
| WO | 2013119367 | 8/2013 |
| WO | 2013188009 | 12/2013 |

* cited by examiner

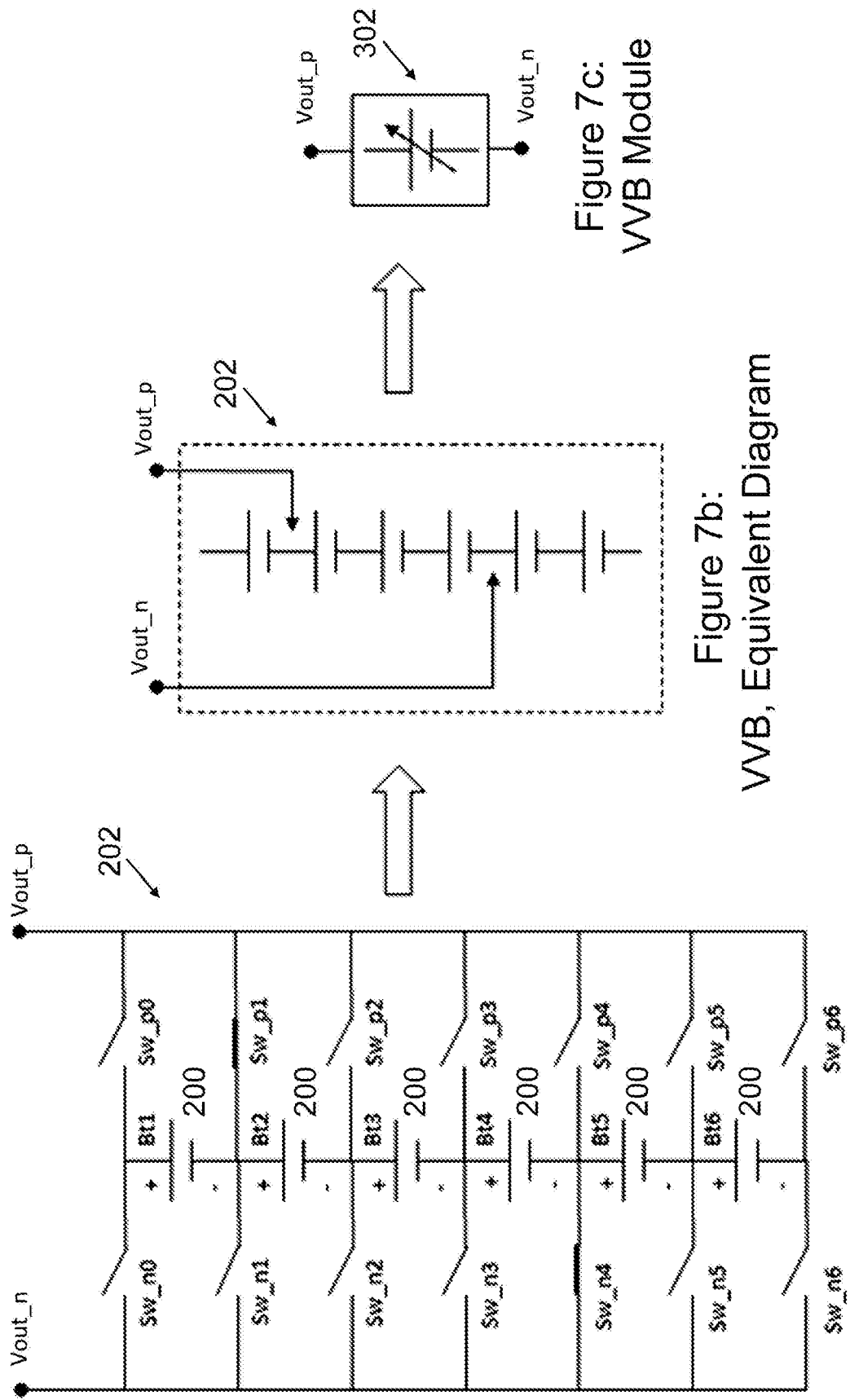

Stacked Variable Voltage Battery

SVVB Module

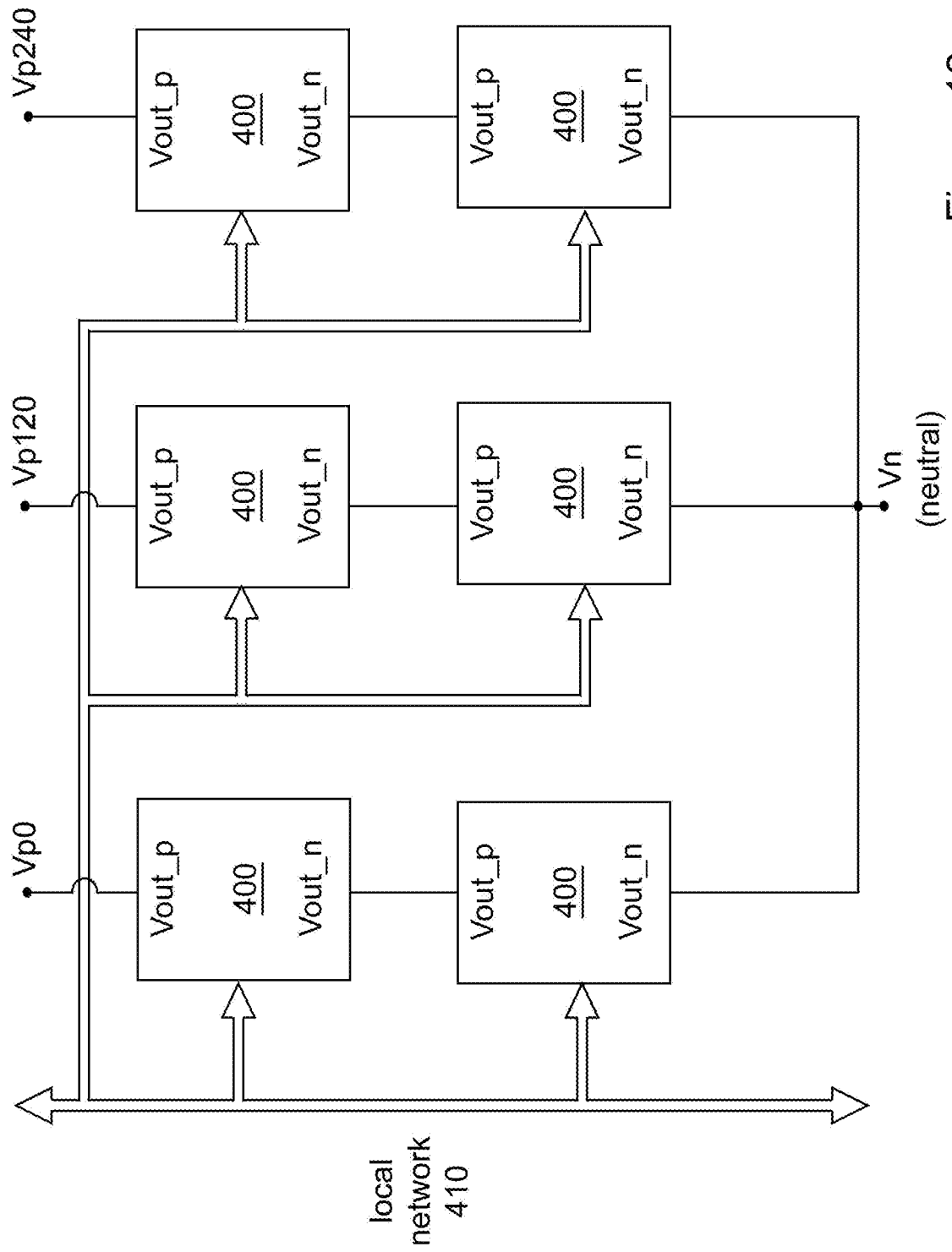

STACKED VARIABLE VOLTAGE BATTERY MODULE ARRANGEMENT

This application claims the benefit of U.S. provisional patent application No. 62/620,739 filed on Jan. 23, 2018, which is incorporated herein and made a part hereof by reference.

BACKGROUND OF THE INVENTION

The present invention relates to the field of reconfigurable variable voltage electric batteries designed for use with inverters, energy storage systems, uninterruptable power supplies, and the like, including variable voltage batteries for use in the drive systems of electric vehicles such as bicycles, automobiles, trucks, locomotives, utility carts, and the like.

This application is an improvement to and an extension of commonly owned U.S. Pat. No. 8,816,613, which issued on Aug. 26, 2014, entitled Reconfigurable Battery (hereinafter referred to as "Reconfigurable Battery Patent"), the entire contents of which is incorporated herein by reference for all purposes.

It should be noted that a practical system such as an electric vehicle involves two distinct operations, one that drives the motor and the corresponding drive wheel(s) by supplying current from the battery to the motor(s), and another that uses the current from the motor(s) to charge the battery to achieve regenerative braking, thereby slowing down the vehicle. It should be further apparent to those skilled in the art that in order to recharge the battery, one needs an inverter that increases the voltage from the motor to a value higher than the battery voltage, in order for the current to flow back into the battery.

For a typical rechargeable battery, the charging voltage must be higher than the battery voltage. The higher the charging voltage relative to the battery voltage, the more current flows into the battery. Controlling the charging voltage is one of the ways to control the rate of recharging, as well as the rate of braking. Another way to control the recharging rate is pulse width modulation (PWM), where a switch between the charging source and the battery regulates an on-off duty cycle. Of course, the charging voltage still needs to be higher than the battery voltage for such a device to work.

In most electric vehicles such as electric bicycles and electric cars that utilize regenerative braking, the electrical system typically consists of several subsystems, namely a motor, a speed controller, an inverter, and a battery. Sometimes the speed controller regulates both the drive and braking current via PWM. Potentially, a clever inverter design could regulate both driving and braking by regulating the voltage to the motor for driving, and regulating the voltage to the battery for regenerative braking, thereby eliminating the need for a separate speed controller.

However, an inverter is not an easy device to design or cheaply produce, as it must handle a large amount of current (especially during quick braking) and sometimes a high output voltage, while its input voltage can fluctuate over a wide range. The input voltage in this case is the back EMF from the motor, typically close to zero when the vehicle is coming to a stop, and close to the maximum battery voltage when the vehicle is coasting on a level ground at its maximum speed (usually the battery voltage limits the top speed).

Also, an inverter typically achieves its functionality using rapid switching devices. One inverter design could turn the DC current from the motor to AC current first, increase the voltage using a step-up transformer, and convert the AC current back to DC in order to recharge the battery. Another inverter design could use temporary energy storage elements such as capacitors and inductors in a charge-pump configuration in order to raise the voltage. The switching frequency involved is typically in the order of 1-100 KHz. In most of the known inverter designs, the energy loss is significant, and the cost is very high due to the high current requirement (100 Amps or more) in addition to the weight.

The Reconfigurable Battery Patent discloses a battery and/or electric motor configuration that provides driving and regenerative braking, for example in an electric vehicle, over a reasonable range of operations without the need for an inverter. The Reconfigurable Battery Patent also discloses a reconfigurable battery and battery control system that provides duty cycle modulation of an array of battery cells for intermediate output voltage control without incurring large switching losses, while simultaneously reducing switching induced transient signals.

It would be advantageous to extend the concepts set forth in the Reconfigurable Battery Patent to provide greater configurability, greater scalability and modularization, increased efficiency, and improved charge balancing, all at reduced costs.

The methods and apparatus of the present invention provide a series connected stack of reconfigurable variable voltage battery modules having these and other advantages.

SUMMARY OF THE INVENTION

The present invention relates to reconfigurable batteries, e.g., for use in energy storage applications or the drive systems of electric vehicles. In particular, the present invention is an extension of the Reconfigurable Battery Patent which discloses a variable voltage battery with a statically joined plurality of series connected battery cells.

With the present invention, one or more variable voltage battery (VVB) modules are connected in series to form a stacked variable voltage battery (SVVB or Stacked VVB). A variable voltage battery module in accordance with the present invention may comprise the variable voltage reconfigurable battery (or modified versions thereof) described in the Reconfigurable Battery Patent. By separately configuring the switches of each VVB module, the output of the stacked VVB module can produce any voltage up to the full sum of the voltages of all the cells in the individual VVB modules. In addition, charge balancing can easily be achieved with a stacked VVB configuration, as some VVB modules can be bypassed (e.g., by setting select switches to simulate a short condition) so that weaker VVB modules can be recharged first.

In accordance with an example embodiment of the present invention, a reconfigurable stacked variable voltage battery (SVVB) module arrangement may comprise a first SVVB electrical output connection, a second SVVB electrical output connection, and at least two variable voltage battery (VVB) modules arranged in a series configuration between the first SVVB electrical output connection and the second SVVB electrical output connection. Each VVB module may comprise at least one battery cell and processor-controlled switches adapted to vary the output voltage of each of the VVB modules. An overall output voltage between the first SVVB electrical output connection and the second SVVB electrical output connection is configurable via the processor-controlled switches of the VVB modules.

The processor-controlled switches of each VVB modules may comprise at least one processor-controlled switch electrically connected between a first voltage pole of the at least one battery cell and a first VVB electrical output connection, and at least one processor-controlled switch electrically connected between a second voltage pole of the at least one battery cell and a second VVB electrical output connection. The processor-controlled switches may be adapted to electrically reconfigure the corresponding VVB module by selectively coupling or uncoupling the first voltage pole of the at least one battery cell with the first VVB electrical output connection and the second voltage pole of the at least one battery cell with the second VVB electrical output connection to provide a reconfigurable battery output voltage between the first VVB electrical output connection and the second VVB electrical output connection of the corresponding VVB module.

The at least one battery cell may comprise at least two battery cells connected in a series configuration. In such an arrangement, the processor-controlled switches may be arranged between each of the series connected battery cells and the first electrical output connection and between each of the series connected battery cells and the second electrical output connection.

The SVVB module arrangement may further comprise a main control processor for controlling the processor-controlled switches of each variable voltage battery module. Alternatively, each VVB module may further comprise a local control processor for controlling the processor-controlled switches of the corresponding VVB module.

The at least two VVB modules may comprise N VVB modules, wherein N is greater than two. The at least one battery cell of a corresponding VVB module may comprise M battery cells, where M is greater than one. Further, the number of battery cells of each of the VVB modules may be different.

The processor-controlled switches may be configurable such that the overall output voltage ranges from an overall maximum voltage equal to a sum of maximum positive voltages of each VVB module to an overall maximum negative voltage equal to a sum of maximum negative voltages of each VVB module. Further, the processor-controlled switches may be selectively configurable to provide a VVB module output of at least one of zero voltage, positive voltage, negative voltage, or an open circuit for each of the at least two VVB modules.

The processor-controlled switches may be configured by one of pulse width modulation signaling or pulse density modulation signaling. For example, the processor-controlled switches may be continuously reconfigured in order to generate an AC waveform between the first and second electrical output connections. The processor-controlled switches may be configurable to at least one of: produce an AC waveform; accept an AC waveform; produce an AC waveform for discharging one or more of the battery cells; or accept an AC waveform for charging one or more of the battery cells.

In addition, the processor-controlled switches may be configurable to bypass a failed VVB module or a failed battery cell within the corresponding VVB module.

The SVVB module arrangement may further comprise at least one of an inductive or a capacitive element for at least one of voltage and current waveform filtering.

In a further example embodiment, additional processor-controlled switches may be provided between at least one of the at least two VVB modules and the first SVVB electrical output connection, and between at least one of the at least two VVB modules and the second SVVB electrical output connection.

For example, additional processor-controlled switches may be provided between each VVB module and the first SVVB electrical output connection, and between each VVB module and the second SVVB electrical output connection.

Two or more SVVB modules may be arranged in series to at least one of: (a) increase voltage output range, and (b) provide three or more electrical output connections.

Two or more SVVB modules may be arranged in parallel to increase current output range.

The processor-controlled switches may comprise semiconductor switches.

One or more of the at least two VVB modules may include at least one high side MOSFET semiconductor switch coupled to a voltage translation sub-module for setting the switching state, and one or more of the at least two VVB modules may include a supply voltage source for supplying voltage to a voltage translation sub-module in at least one adjacent VVB module.

The present invention also encompasses a method for reconfiguring a stacked variable voltage battery (SVVB) module arrangement. The SVVB module arrangement may comprise a first SVVB electrical output connection, a second SVVB electrical output connection, and at least two variable voltage battery (VVB) modules arranged in a series configuration between the first SVVB electrical output connection and the second SVVB electrical output connection. Each VVB module may comprise at least one battery cell and processor-controlled switches adapted to vary the output voltage of each of the VVB modules. The method may comprise: at least one of opening and closing one or more of the processor-controlled switches of at least one of the at least two VVB modules to provide a first switch configuration for providing a first overall output voltage between the first SVVB electrical output connection and the second SVVB electrical output connection; and at least one of opening and closing one or more of the processor-controlled switches of at least one of the at least two VVB modules to provide a second switch configuration for providing a second overall output voltage between the first SVVB electrical output connection and the second SVVB electrical output connection.

The method may encompass or incorporate any of the features or functionality of the SVVB module discussed above.

BRIEF DESCRIPTION OF THE DRAWINGS

The present invention will hereinafter be described in conjunction with the appended drawing figures, wherein like reference numerals denote like elements, and:

FIG. 7 (FIGS. 7a-7c) shows an example embodiment of a variable voltage battery module in accordance with the present invention;

FIG. 12c shows an example embodiment of stacked variable voltage modules connected to produce 3-phases of output in accordance with the present invention;

DETAILED DESCRIPTION

Figure 1A:
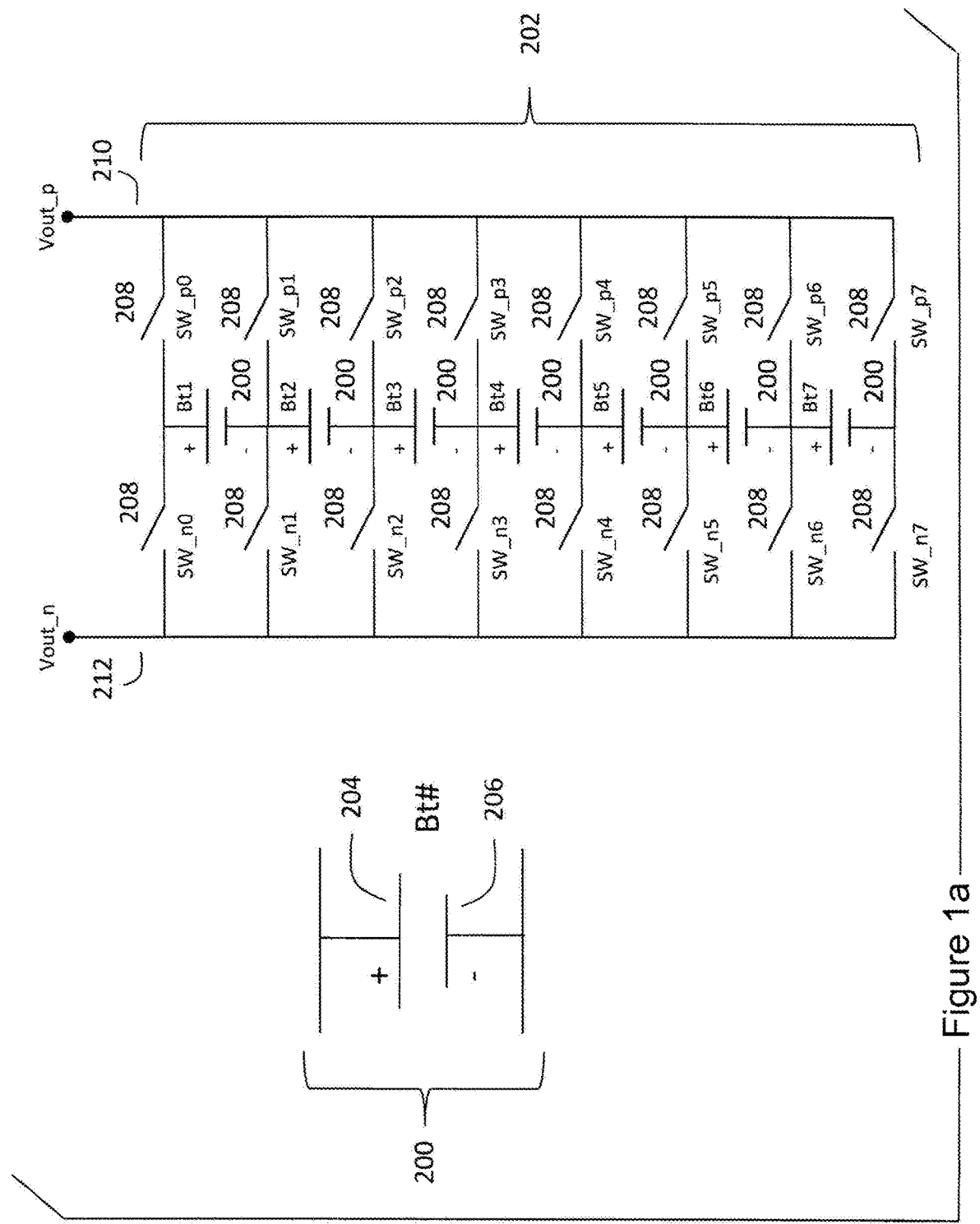
FIG. 1a shows an example embodiment of a reconfigurable battery.

The following detailed description provides example embodiments only, and is not intended to limit the scope, applicability, or configuration of the invention. Rather, the detailed description of the example embodiments will provide those skilled in the art with an enabling description for implementing an embodiment of the invention. It should be understood that various changes may be made in the function and arrangement of elements without departing from the spirit and scope of the invention as set forth in the appended claims.

The fundamental problem to be solved when recharging a battery from a motor or an electrical power grid is to keep the charging voltage higher than the battery voltage. The present invention solves this by effectively lowering the battery voltage during charging periods. This is accomplished in accordance with the present invention by means of a reconfigurable battery. As long as the battery voltage is lower than the voltage generated by the motor or electrical power grid, recharging is accomplished. Accordingly, with the present invention, there is no need to raise the voltage out of the motor using an inverter.

FIGS. 1a through 6 illustrate the variable voltage reconfigurable battery and method in accordance with the Reconfigurable Battery Patent. FIGS. 1a-1h show a single bank of a statically joined plurality of series connected battery cells 200 of a battery 202. A statically joined plurality of series connected battery cells 200 have no additional circuit elements, such as switches, that can break an electrical connection between adjacent battery cells. Each such group of statically joined plurality of series connected battery cells 200, is designated as a "Bank". Banks of battery cells 200 can be configured together in series or parallel connection.

In FIGS. 1a through 1h a bank of seven (7) battery cells 200 of a battery 202 arranged in a series configuration is shown. The battery cells are designated Bt1 through Bt7. Each battery cell 200 has a first voltage pole 204 and a second voltage pole 206. The first voltage pole 204 of each battery cell 200 shown is at a higher direct current (DC) voltage potential than the second voltage pole 206, and therefore the first voltage pole 204 is designated as "+" and the second voltage pole 206 is designated as "−". A first electrical output connection 210 is designated as Vout_p, and a second electrical output connection 212 is designated as Vout_n. The first electrical output connection 210 may function as the positive terminal of a battery 202, while the second electrical output connection 212 may function as the negative terminal of a battery 202. At least one switching means 208 provides electrical connection between the first voltage pole 204 of each battery cell 200 in the series to a first electrical output connection 210 (designated Vout_p). The switching means 208 may comprise a processor-controlled switch.

In the FIGS. 1a-1h, the switching means 208 designated sequentially SW_p0 through SW_p6 connect the positive pole of each battery cell to Vout_p. Also, at least one switching means 208 provides electrical connection of a second voltage pole 206 of each battery cell 200 in the series to a second electrical output connection 212 (designated Vout_n). The switching means 208 designated sequentially SW_n1 through SW_n7 connect the negative pole of each battery cell to Vout_n. Additionally, at least one switching means 208 can electrically connect the first voltage pole 204 of a battery cell 200 at the beginning of the plurality of series connected battery cells 200 to the second electrical output connection 212.

The switching means 208 designated SW_n0 connects the positive pole of Bt1 to Vout_n. At least one switching means 208 can electrically connect the second voltage pole 206 of an end battery cell 200 in the statically joined plurality of series connected battery cells 200 to the first electrical output connection 210. In the FIGS. 1a-1h, switching means 208 designated SW_p7 connects the negative pole of Bt7 to Vout_p. The switching means 208 may, for example, comprise MOSFET transistors. In some implementations, Pulse Width Modulation or Pulse Density Modulation circuitry is included as part of the switching means. In other embodiments, the MOSFET transistors can be configured without PWM or PDM.

Closing a switching means 208 between a first voltage pole 204 and the first electrical output connection 210, and closing a switching means 208 between a second voltage pole 206 and the second electrical output connection 212 provides a voltage differential at the electrical output connections, and allows current to flow when the battery 202 is connected to a load (or to a battery charging circuit). In the FIGS. 1a-1h, output voltage Vout, is the difference in potential between the first electrical output connection 210 designated Vout_p, and the second electrical output connection 212 designated Vout_n.

The battery cells 200 are reconfigured to provide an output voltage that is approximately equal to the voltage summation of the electrically reconfigured battery cells 200, and is in a range between zero volts and a maximum output voltage for the plurality of series connected battery cells 200. The voltage is determined by the number and technology of the cells provided.

Figure 1B:
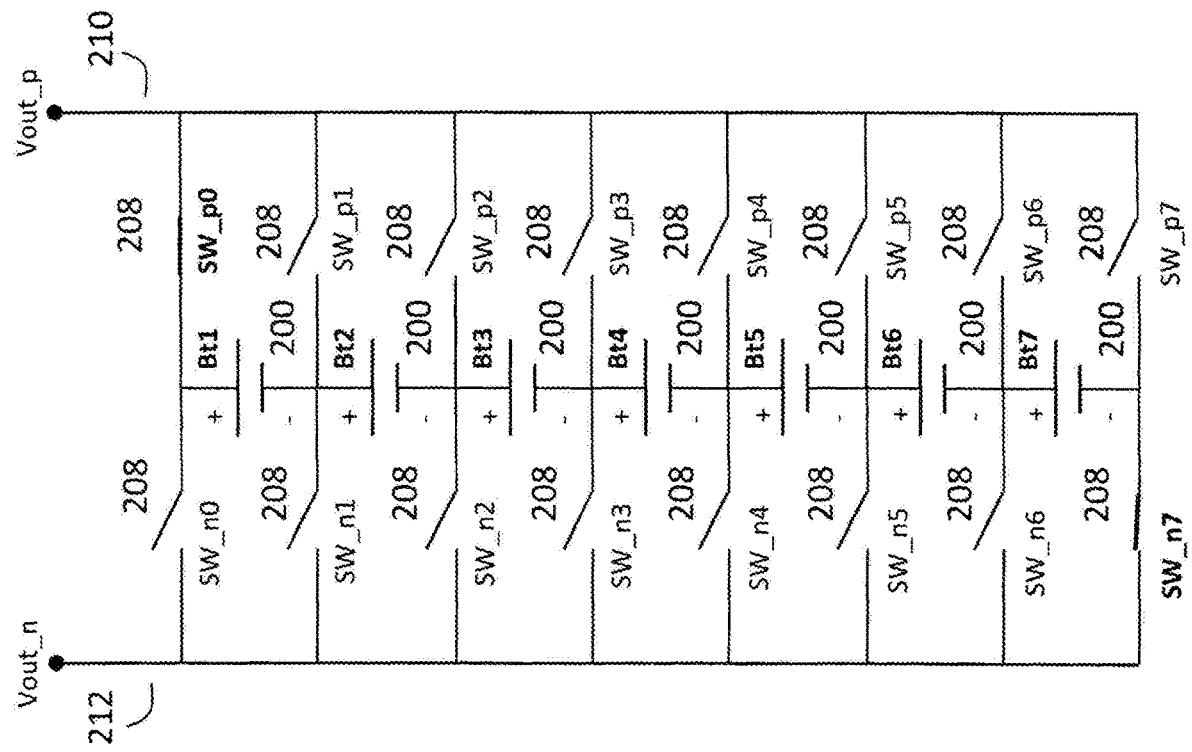
FIG. 1b shows an example embodiment of a configured reconfigurable battery with maximum output voltage.

FIG. 1a shows a configuration with all switches 208 in an open state such that no current flow occurs, and Vout=0 volts. FIG. 1b shows a configuration whereby maximum voltage is realized from the bank of statically joined plurality of series connected battery cells 200 by closing the switching means 208 (in particular, switch SW_p0) connecting the positive pole of the first battery cell, Bt1, to Vout_p and closing the switching means 208 (in particular, switch SW_n7) connecting the negative pole of the last battery cell, Bt7, to Vout_n. Vout equals the sum of the voltages of connected battery cells in the series Bt1 through Bt7. For example, if each battery cell 200 is Lithium Ion technology with nominal voltage of 3.6V, for this configuration of seven battery cells, Vout=25.2 volts minus switching and other losses.

Figure 1C:
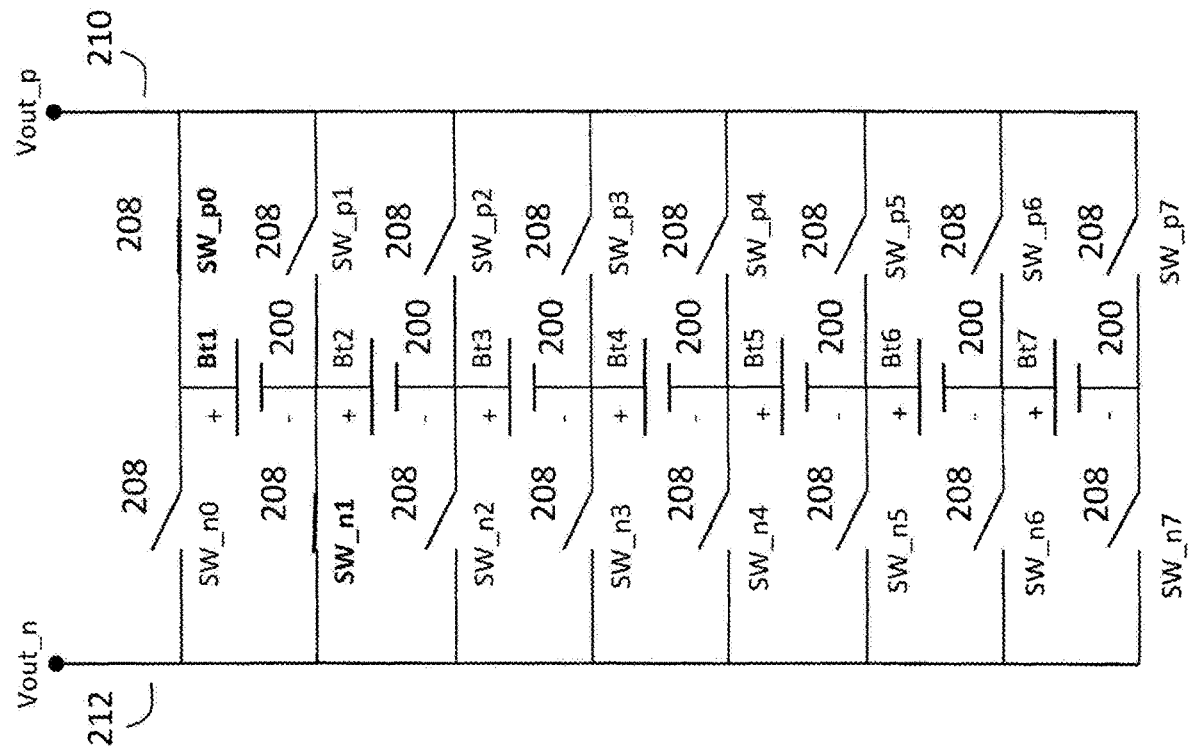
FIG. 1c shows an example embodiment of a configured reconfigurable battery with single battery cell output voltage.

FIG. 1c shows an example configuration whereby a single cell voltage is realized at the output from the statically joined plurality of series connected battery cells 200. Voltage of cell Bt1 is realized between output connections Vout_p and Vout_n by closing switches SW_p0 and SW_n1.

Figure 1D:
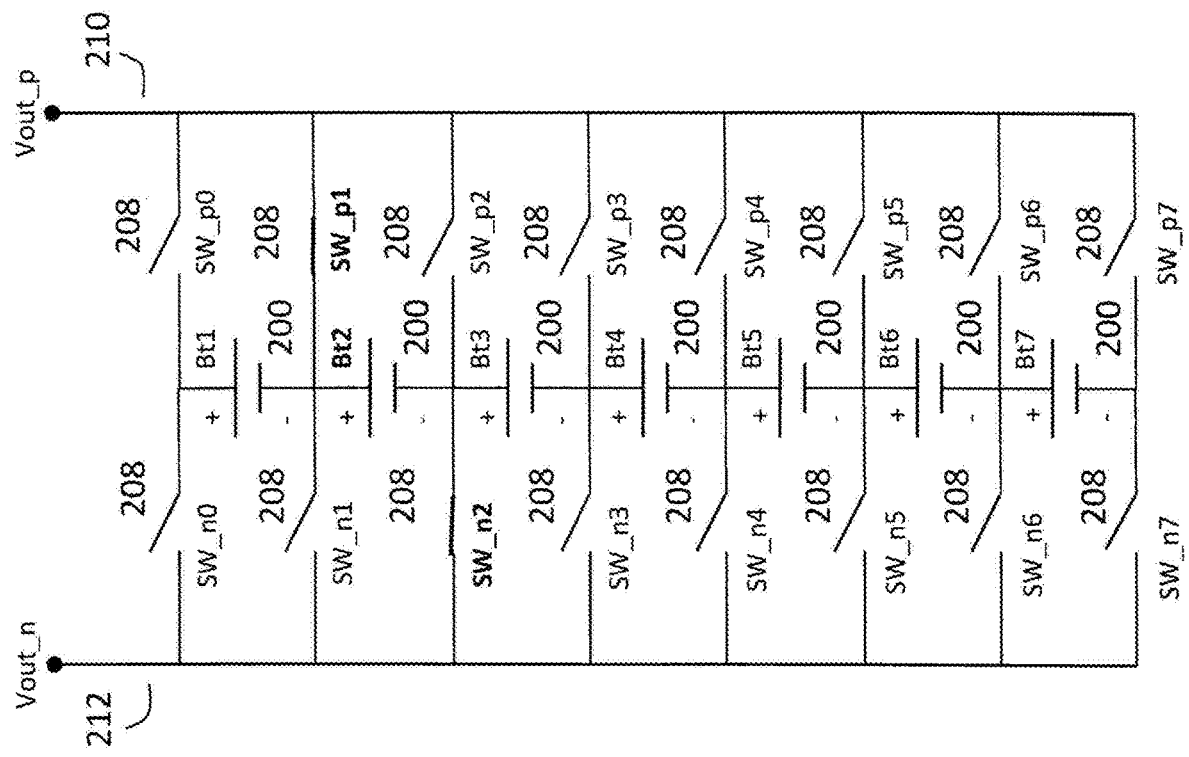
FIG. 1d shows an alternative example embodiment of a configured reconfigurable battery with single battery cell output voltage.

FIG. 1d shows an alternative example configuration, where the output voltage is also about equal to a single cell voltage by connecting battery cell Bt2 to the first electrical output connection 210 and the second electrical output connection 212. Voltage of cell Bt2 is realized between output connections Vout_p and Vout_n by closing switches SW_p1 and SW_n2.

Figure 1E:
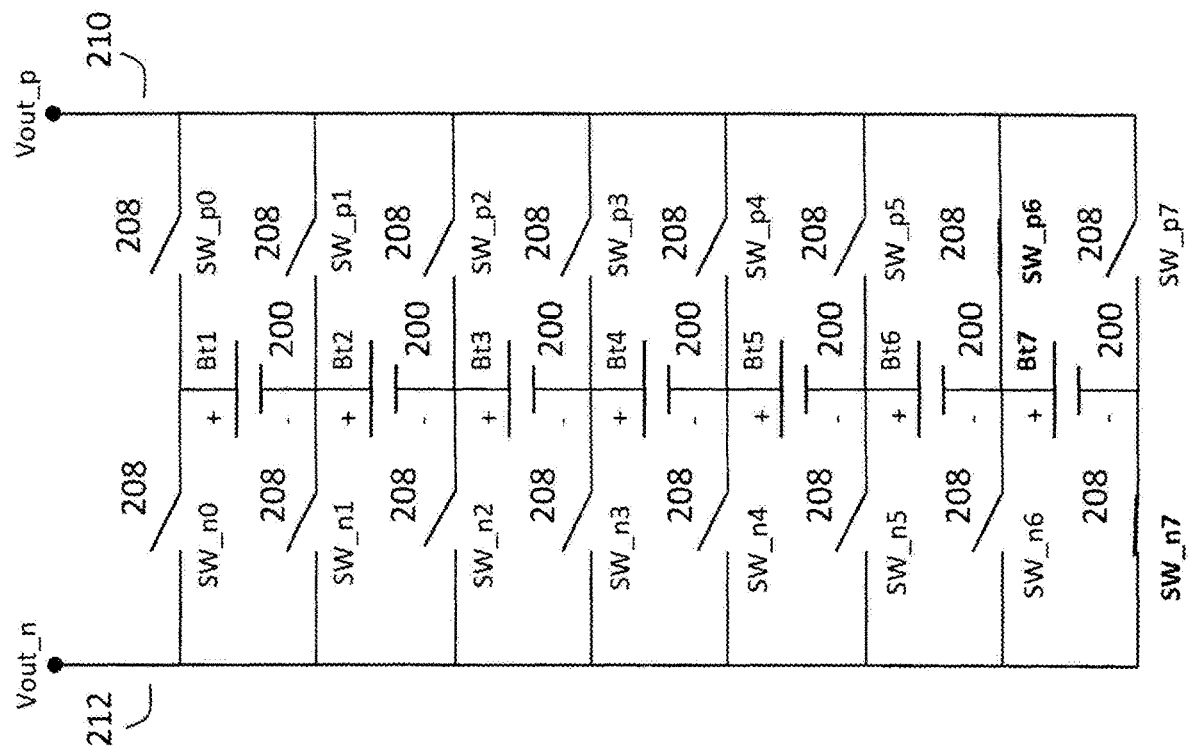
FIG. 1e shows an example embodiment of a configured reconfigurable battery with single battery cell output voltage.

FIG. 1e shows another alternative example configuration, where output voltage is about equal to the voltage of a single battery cell, Bt7. Voltage of cell Bt7 is realized between output connections Vout_p and Vout_n by closing switches SW_p6 and SW_n7.

In any series configuration of a plurality of battery cells as described in this embodiment, there are N ways to realize a single cell voltage, where N is the number of cells in the battery.

Figure 1F:
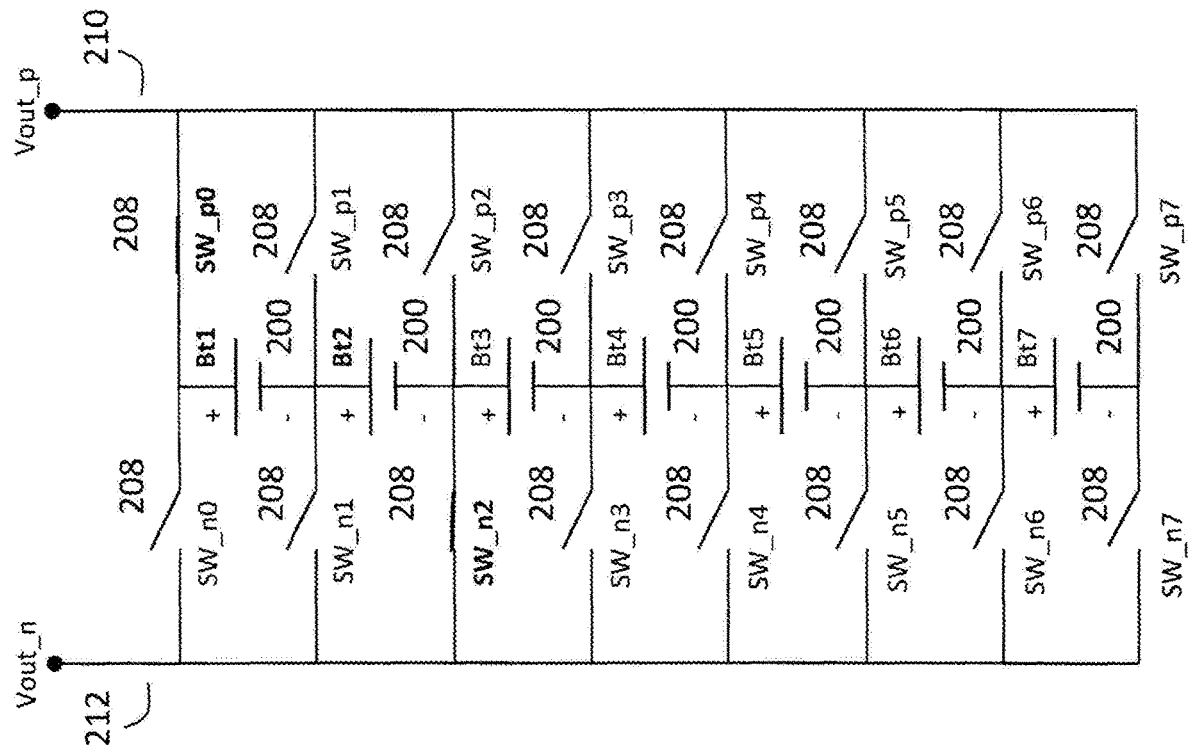
FIG. 1f shows an example embodiment of a configured reconfigurable battery with two battery cell output voltage.
Figure 1G:
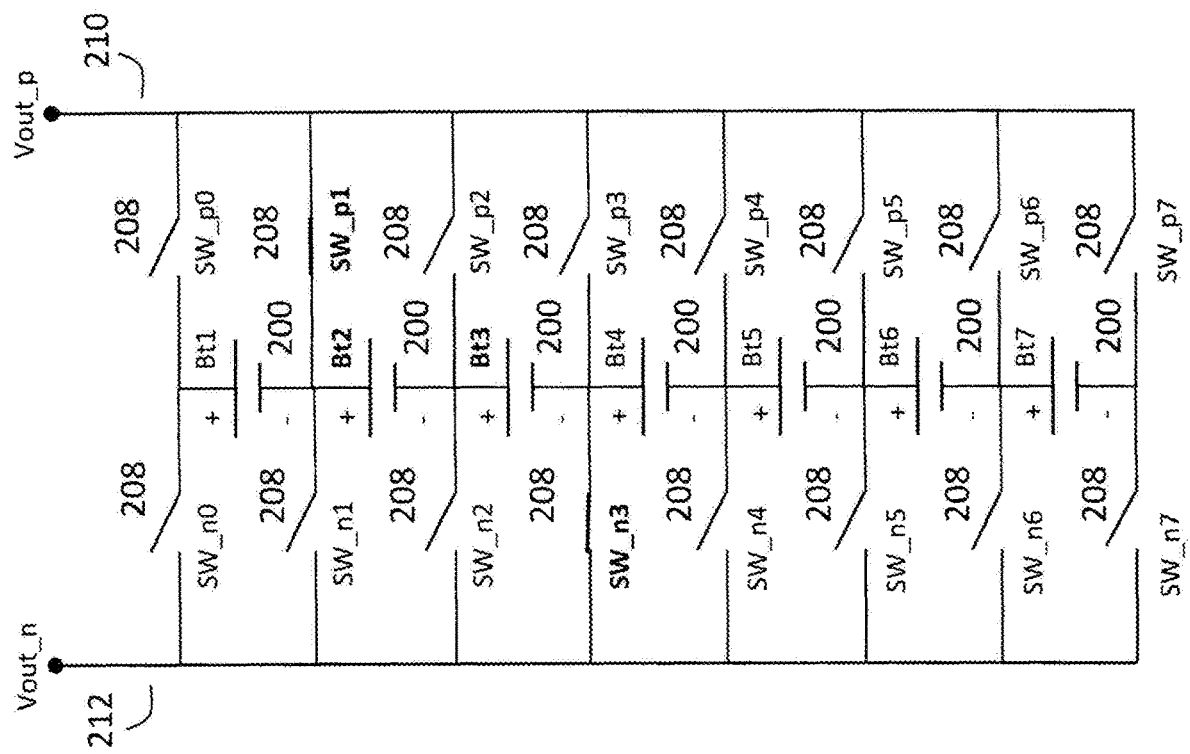
FIG. 1g shows an alternative example embodiment of a configured reconfigurable battery with two battery cell output voltage.
Figure 1H:
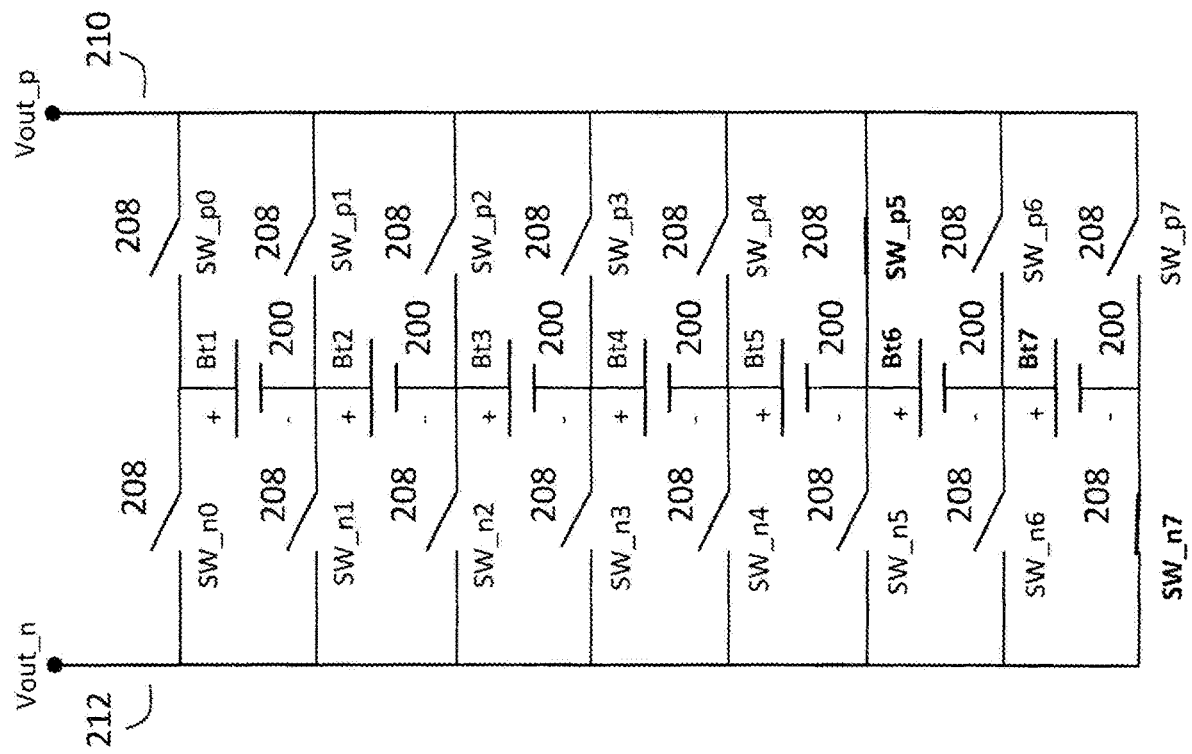
FIG. 1h shows a second alternative example embodiment of a configured reconfigurable battery with two battery cell output voltage.

FIG. 1f shows a configuration whereby an intermediate voltage is realized at the voltage output from the series configured plurality of battery cells 200. In this example, the voltage sum of two (2) battery cells 200 is realized. In particular, the voltage sum of cells Bt1 and Bt2 is realized between output connections Vout_p and Vout_n by closing switches SW_p0 and SW_n2. FIG. 1g and FIG. 1h show two additional alternate configurations of connecting two series connected battery cells to the voltage output.

In a series configuration of a plurality of battery cells 200, as described in this exemplary embodiment, there are N−1 ways to realize a two-cell voltage, where N is the number of cells 200 in the battery.

Without including configurations of voltage polarity reversal, for any number of N statically joined plurality of series connected battery cells 200 as described in this exemplary embodiment, with a switched set of P electrically contiguous battery cells 200, there are (N−P)+1 ways to configure them.

Voltage polarity may be selectively reversed by activating a switching means 208 that would connect a first voltage pole 204 of a battery cell 200 to a second electrical output connection 212 instead of connecting it to a first voltage electrical output connection 210, and connecting a second voltage pole 206 to a first electrical output connection 210. For example, in the example configuration shown in FIG. 1c, closing switching means SW_n0 instead of SW_p0, and SW_p1 instead of SW_n1 would cause polarity reversal at the electrical output connections 210 and 212. Such polarity reversal may be useful for motor activated braking. Reverse polarities are also important if the battery module is to be connected to an electrical power grid having an AC voltage that can be both positive and negative.

One useful consequence of having (N−P)+1 ways to configure P cells is that it allows cells to be load balanced in a time sequential manner, maintaining nominal voltage by alternating drain on sets of P electrically connected cells.

A useful consequence of connecting the battery cells 200 in a series configuration without switching means 208 between the cells allows switch induced voltage loss to be kept minimal because only two switching means 208 need be activated when an electrical load is applied.

Figure 2A:
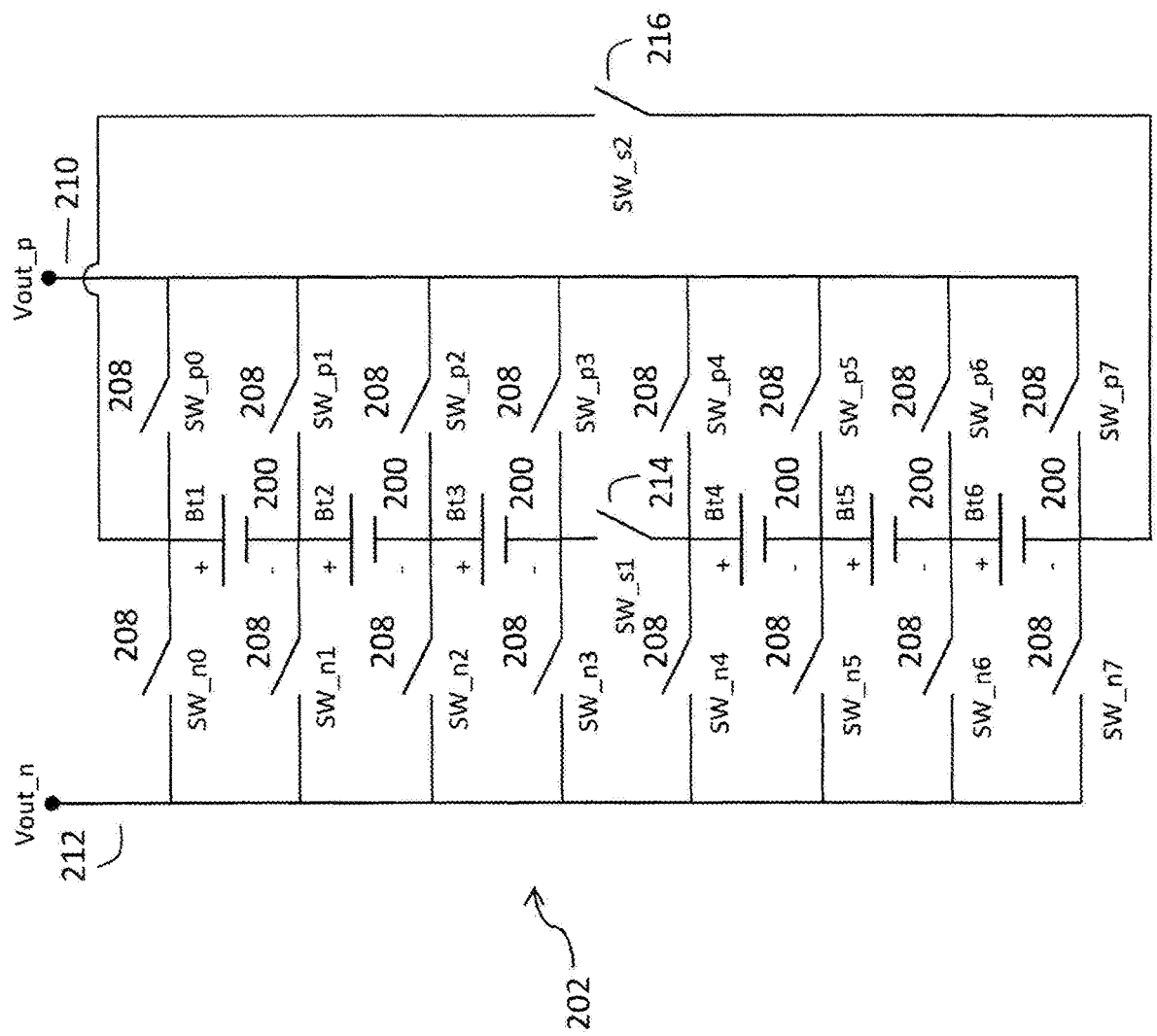
FIG. 2a shows an example embodiment of a reconfigurable battery with two banks of battery cells.
Figure 2B:
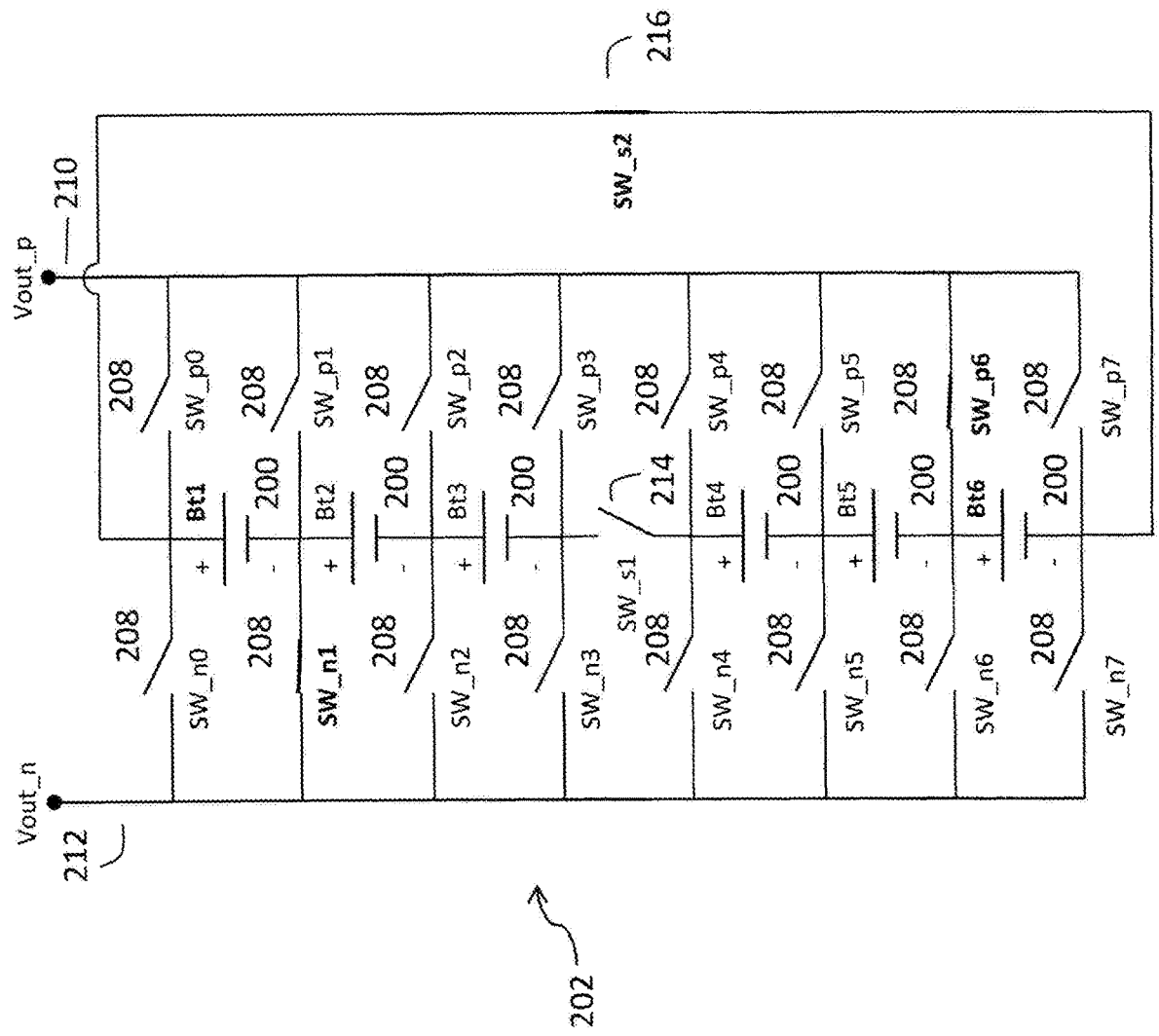
FIG. 2b shows an example embodiment of a configured reconfigurable battery with two banks of battery cells.
Figure 2C:
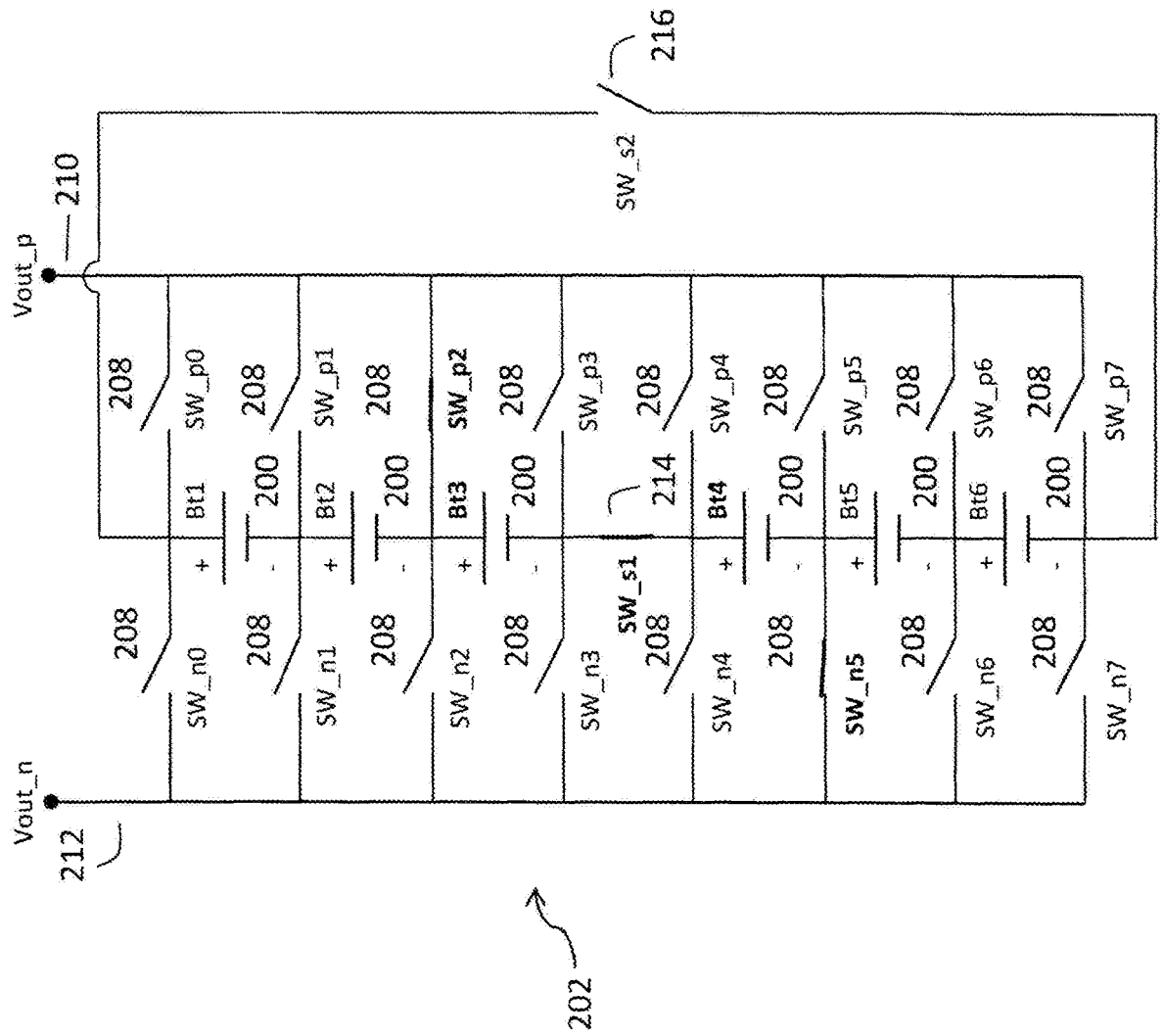
FIG. 2c shows an alternative example embodiment of a configured reconfigurable battery with two banks of battery cells.

Another alternative example embodiment of a reconfigurable battery and method in is shown in FIGS. 2a through 2c. These Figures show a first bank of statically joined plurality of series connected battery cells 200, designated Bt1 through Bt3, that is joined to a second bank of statically joined plurality of series connected battery cells 200, designated Bt4 through Bt6, in a series connection. The switching means 208 designated sequentially SW_p0 through SW_p7 connect the batteries Bt1 through Bt6 to Vout_p. The switching means 208 designated sequentially SW_n1 through SW_n7 connect the batteries Bt1 through Bt6 to Vout_n A first intermediate switching means 214, designated as SW_s1, is connected between a second ("−") voltage pole 206 of an end positioned battery cell in a first bank, designated as Bt3, and a first ("+") voltage pole 204 of a beginning positioned battery cell in a second bank, designated as Bt4. A second intermediate switching means 216 is connected between a first ("+") voltage pole 204 of a beginning positioned battery cell, designated as Bt1, in a first bank and a second ("−") voltage pole 206 of an end positioned battery cell in a second bank, designated as Bt6. Essentially two (2) groupings of three (3) battery cells 200, referred to as banks, are configured in the example configuration. The first electrical output connection of the two banks are commonly connected, designated as Vout_p. Also, the second electrical output connection of the two banks are commonly connected, designated as Vout_n. It should be appreciated that additional banks can be provided in a similar configuration.

The placement of a switching means intermediate between the banks of battery cells effectively separates connectivity between two adjacent cells when the switches are open, resulting in the two banks of battery cells that can be independently configured. Each independent bank of statically joined plurality of series connected battery cells 200 functions in the manner described in the example embodiment of FIGS. 1a through 1h. The switching means 208, first intermediate switching means 214, and second intermediate switching means 216 may be MOSFET transistors with, e.g., Pulse width Modulation or Pulse Density Modulation circuitry included.

If the battery cells to be configured sit in a single bank, closing a switching means 208 between a first voltage pole 204 and the first electrical output connection 210, and closing a switching means 208 between a second voltage pole 206 and the second electrical output connection 212 manifests output voltage. However, if connection is desired between a battery cell 200 that sits in one bank and a battery cell 200 that sits in another bank, either the first intermediate switching means 214 or the second intermediate switching means 216 must be closed to realize voltage between the output connectors 210 and 212. To prevent a short circuit in the series configured battery 202, the first and second intermediate switches 214 and 216 may not both be simultaneously closed. With the first and second intermediate switches 214 and 216 both set in an open state, the two banks are connected in parallel.

FIG. 2a shows an example configuration of a series connected reconfigurable battery 202 with all switching means in an open state such that no voltage appears at the output. Intermediate switches SW_s1 and SW_s2 are open, such that the two banks of cells are in a parallel connection. All switches 208 in the banks are also open so that Vout is equal to zero volts.

FIG. 2b shows an example configuration where two battery cells 200 on opposite ends of the two banks, battery cells Bt1 and Bt6, are electrically connected in series through switching means SW_s2. Closed switching means SW_n1 connects battery cell Bt1 to Vout_n and closed switching means SW_p6 connects Bt6 to Vout_p. At the same time, closed second intermediate switching means SW_s2 configures voltage summation of battery cells Bt1 and Bt6.

FIG. 2c shows a configuration where two adjacent battery cells Bt3 and Bt4, one in each bank, are configured through the first intermediate switching means 214. Closed switching means SW_p2 connects battery cell Bt3 to Vout_p, closed switching means SW_n5 connects Bt4 to Vout_n, and closed first intermediate switching means SW_s1 configures voltage summation of battery cells Bt3 and Bt4.

The present embodiment is useful because it permits series connection between battery cells 200 on opposite ends of a plurality of battery cells 200 without requiring electrical connection with cells occupying the middle section of battery cells 200. This helps with battery discharge load distribution and selective charging of cells. This example embodiment affords increased configuration flexibility while only increasing active switching overhead by the two switching means 214 and 216 over the embodiment of FIG. 1a through 1h.

Figure 3:
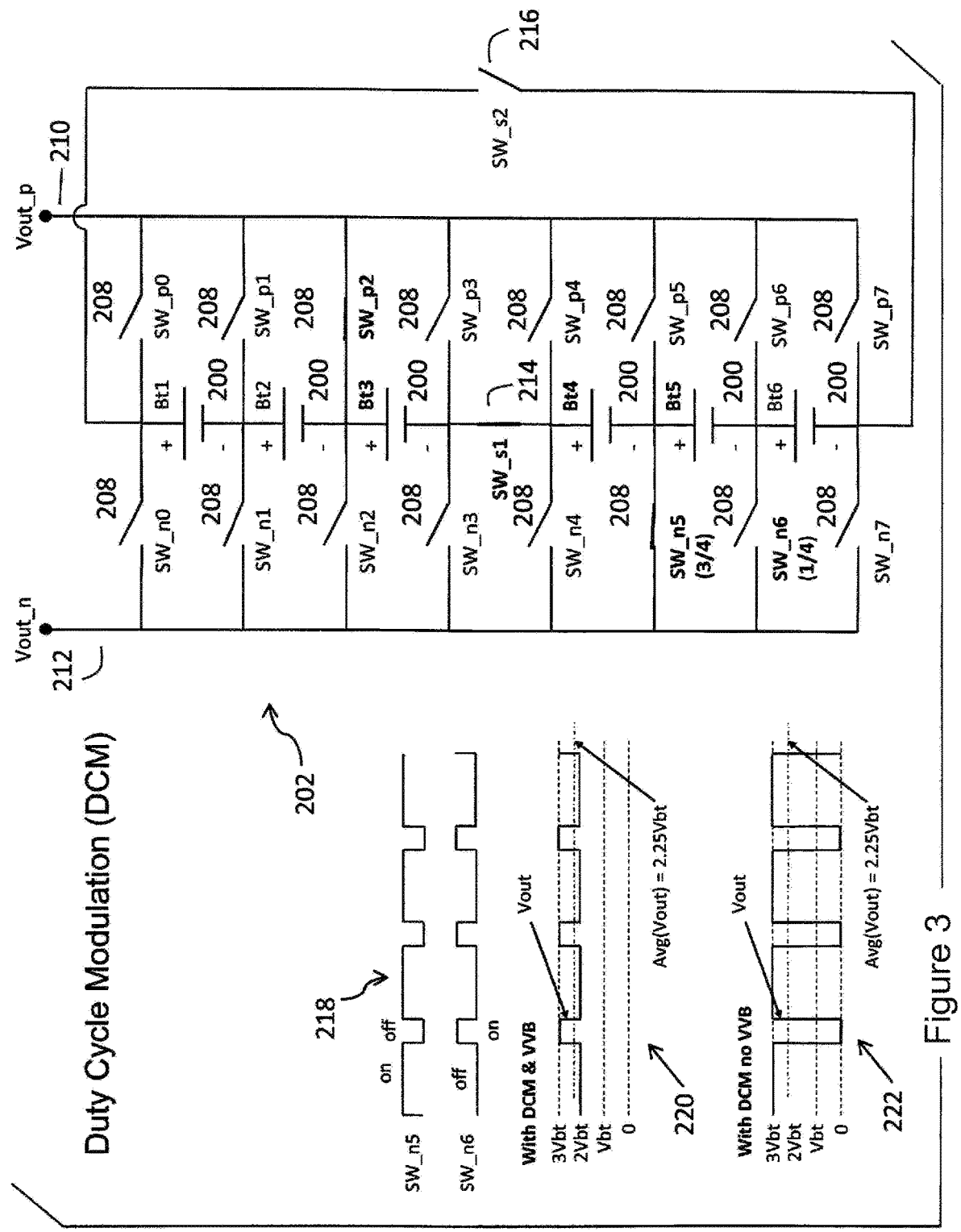
FIG. 3 shows an example embodiment of duty cycle modulation of a configured reconfigurable battery with two banks of battery cells.

Another alternative example embodiment of a method of reconfiguring a battery 202 for series connected battery cells 200 is shown in FIG. 3. The switching means 208 further includes Duty Cycle Modulation ("DCM") by alternatively switching between a first configuration of series connected battery cells 200 exhibiting a first voltage and a second configuration of series connected battery cells 200 exhibiting a second voltage. Duty cycle modulation produces an intermediate output voltage ranging between a first voltage and a second voltage. The example configuration illustrated in FIG. 3 shows modulation of switching means SW_n5 connected to battery Bt4 alternatively switching between an open and closed state. Switching means SW_n6 connected to battery Bt5 inversely mirrors the cycle of switching means SW_n5 by alternatively switching between a closed and open state. As a result, output voltage is averaged between a voltage of two series connected cells 200 and three series connected cells 200. This causes a relatively small voltage difference during switch cycling. The small voltage change is contrasted with a significantly larger voltage change that would occur if the three series connected batteries were to toggle between an off and on state. The result of duty cycle modulation is intermediate control of output voltage with reduced switching transient for voltage, and current.

A simulated digital pulse trace 218 and a simulated voltage trace 220 are shown in FIG. 3. The simulated digital pulse trace 218 demonstrates timing of alternating on and off states of switches SW_n5 and SW_n6. The simulated voltage trace 220 shows the corresponding output voltage, Vout, as a function of time. For this example embodiment, the on state duty cycle of switching means SW_n6 is a quarter of that for switching means SW_n5. As a result, the average output voltage for this example embodiment is equal to ¾(voltage(Bt3)+voltage(Bt4))+¼(voltage(Bt3)+voltage (Bt4)+voltage(Bt5))=2.25 Voltage (Bt) if all battery cell 200 voltages are equal. An illustrative voltage trace using full voltage on-off pulse width modulation 222 is shown for comparison. Note the larger voltage swing between the on and off states without a variable voltage battery, as shown in simulated trace 222.

Figure 4:
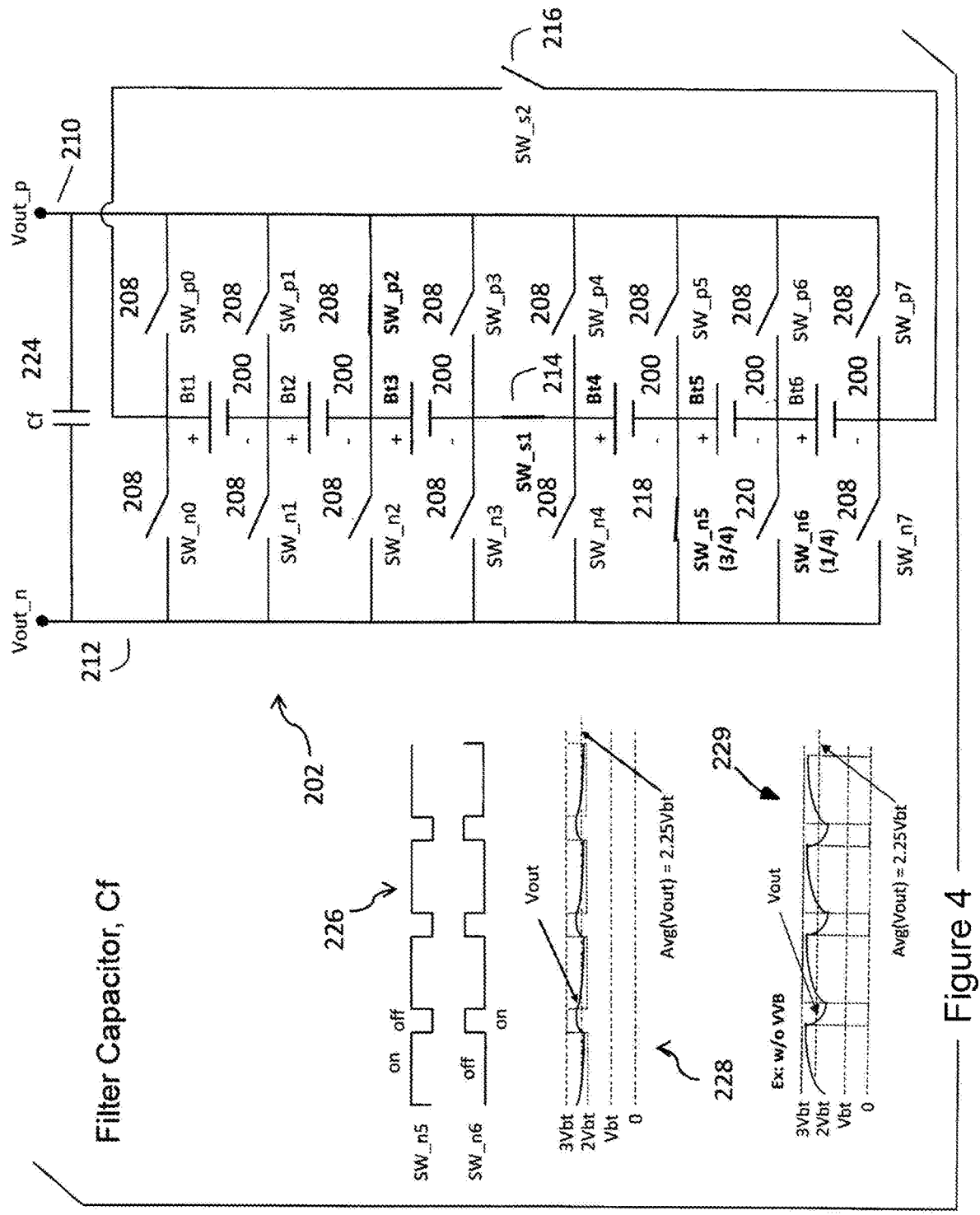
FIG. 4 shows an example embodiment of duty cycle modulation with capacitance filtering of a configured reconfigurable battery with two banks of battery cells.

At least one capacitance filter 224, as shown in FIG. 4, may be added to the above described embodiments to smooth out the output voltage. In the example embodiment shown in FIG. 4, a single capacitor 224 is placed across the output voltage connections 210 and 212. The capacitor is connected in a circuit using duty cycle modulation as described in the preceding embodiment. A simulated digital pulse trace 226 and a simulated voltage trace 228 demonstrate the resulting smoothed waveform obtained by adding the filter to the variable voltage battery ("VVB"). Depending on the switch type, switching method, and waveform filter used in this embodiment, switching rates can be reduced, possibly resulting in energy savings. Inductive filtering can be substituted for (or used in conjunction with) the capacitive filtering, e.g., by providing an inductor in series between the battery and the load. An illustrative voltage trace 229 illustrates, for comparison, the case where the variable voltage battery is not used. Note the larger voltage swing between the on and off states without the VVB, as shown in simulated trace 229.

Figure 5:
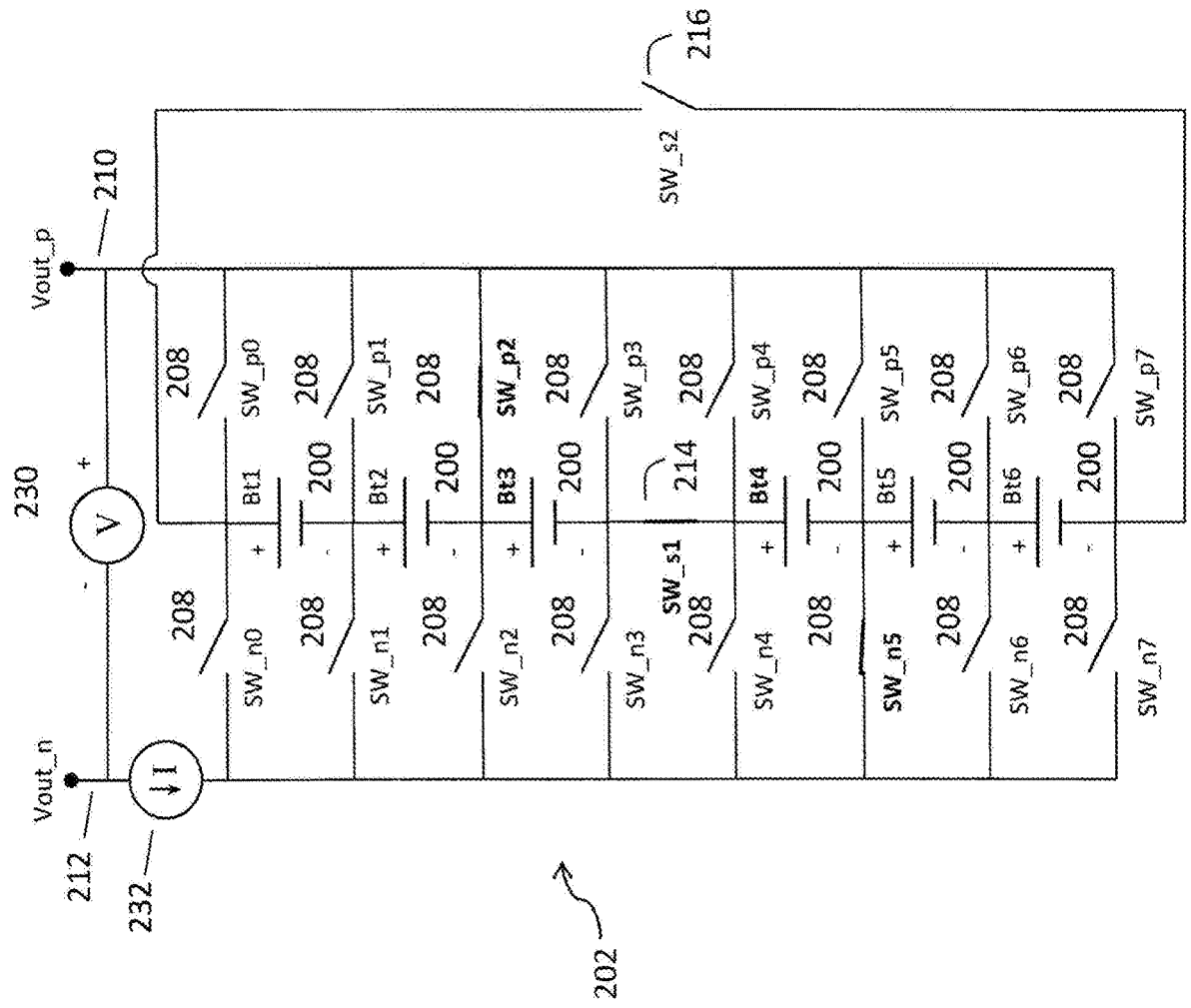
FIG. 5 shows an example embodiment of a configured reconfigurable battery with two banks of battery cells and voltage and current monitoring.

The previously described embodiments may include voltage monitoring 230 and current monitoring 232 as shown in the example embodiment of a reconfigurable series connected plurality of battery cells in FIG. 5. Voltage and current monitoring systems and methods in combination with switching means 208 described herein, allow identification and status monitoring of battery cell 200 charge and discharge states.

The reconfigurable battery 202 described in the preceding embodiments used in combination with at least one electric motor 225 allows motor speed control by regulating battery output voltage based on the number of cells configured in series. Also, battery cell 200 recharge schemes may be customized by selectively configuring the number and relative position of series connected battery cells 200 that match motor 225 output voltage during regenerative braking and charging.

Figure 6:
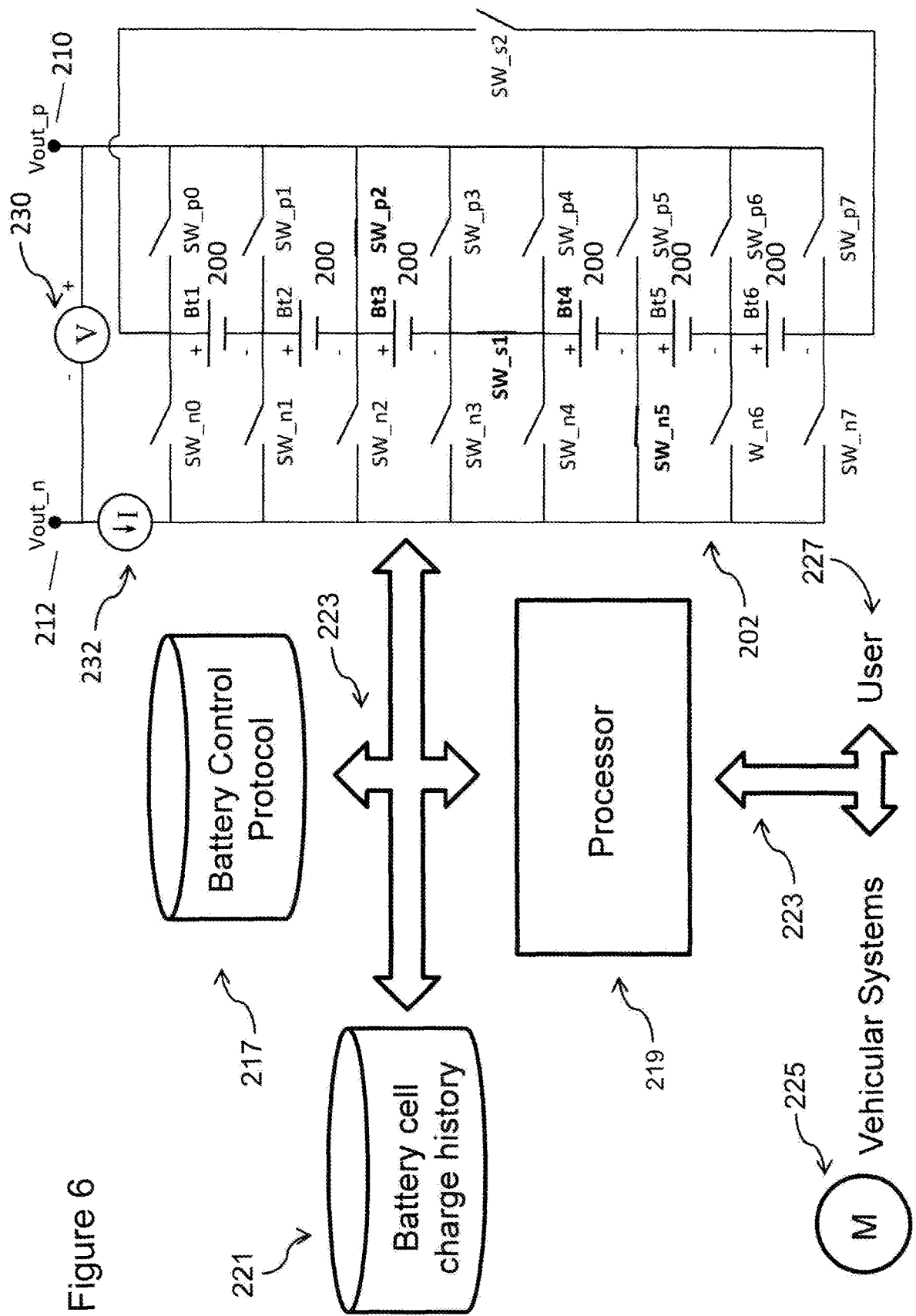
FIG. 6 shows an example embodiment of a configured reconfigurable battery and a switching control system.

FIG. 6 shows a battery reconfiguration control system that can interface with vehicular systems (e.g. motors 225) and communicate with users 227 to control the reconfiguration of switches 208 to bypass weak or dead battery cells 200, short out dying cells 200 if necessary to regain current handling capacity, and balance battery cell 200 usage. An electronic processor 219 such as a microprocessor with associated primary and secondary memory 217 and 221, voltage 230 and current 232 sensors, and associated software can maintain charge/discharge history to help regulate battery cell life and provide load balancing during discharge and recharge states. Battery cell 200 temperature monitoring may also be included since battery duty cycle varies as a function of temperature. Such temperature monitoring is particularly useful for charge and discharge control, as well as for diagnosis of failing cells. Control signals may be exchanged between the sensors 230 and 232, the battery 202, motors 225, and processors 219 using dedicated communication pathways 223 or over power connections 210 and 212.

Powering the battery reconfiguration control system down and powering it up again requires following a predetermined protocol. Power down occurs, for example, when the reconfigurable battery 202 becomes discharged, and requires that all switching means 208 and 214 and 216 be placed in an inactive state (open) as shown in FIGS. 1a and 2a. Powering the system up again begins with activation of the processor 219, perhaps a microprocessor, followed by accessing configuration settings, status of the battery cells, past history and exception states from memory 217 and 221. If a charging cycle is begun, control logic analyzes the information received from memory 217 and 221 and configures switching means 208 to accomplish the task most effectively.

It is noted that measuring the average current flow can take time that may result in an undesirable amount of delay. An alternative is to calculate the current flow expected so that the resistance or the PWM duty cycle can be adjusted in synchrony with the reconfiguration of the battery, the motor, or both.

It should now be appreciated that the variable voltage battery provides advantageous methods and apparatus for reconfiguring a battery having a plurality of battery cells, reconfiguring an electric motor assembly, or a combination thereof.

In accordance with the above-described reconfigurable battery, potential loss is avoided when full current output is needed by keeping the battery cells in a series connection without intervening switches within the series path. Moreover, by tapping at different points in the series connected batteries, the voltage output can be varied with only two switch losses being incurred. The output voltage of the battery can even be set to zero, and if desired (e.g., for emergency braking), the voltage polarity of the battery can be reversed. If all of the series battery cells are used (e.g., the bottom switch on one side and the top switch on the other side are closed), maximum output voltage is achieved. If less than the total number of cells is used, the voltage will be lower. With a battery structure according to the invention, there are many different combinations of switch closings for the same (lower) voltage output. These combinations can be selected in a time sequential manner to even out the drain on the cells without taxing any one cell too much, while maintaining a constant voltage output.

A key benefit of the variable voltage battery is that it allows speed control and regenerative braking in a battery powered vehicle to be easily achieved. This is due to the fact that the battery voltage adapts to the needs of the motor when driving and to the voltage output of the motor during regenerative braking. For example, one of the two switches used to set the battery voltage can be modulated (e.g., using PWM) to provide the motor speed control. Alternatively, it is possible to modulate between two voltage output values to achieve a finer control of the average battery voltage output to the motor. In an all-or-nothing PWM speed control, the voltage to the motor instantly changes from its maximum value to zero when the switch is opened. In such a scenario, there will be a large voltage spike when the motor gets disconnected from the battery since the magnetic field in the motor must collapse. With the disclosed finer voltage control between two voltages, there is much less transient since the circuit is still closed with the battery.

The switching for "reconfiguration" of the battery and for modulation of the switches can occur at a very high rate, e.g., at KHz or even MHz frequencies if the switches (e.g. power MOSFETs) are turned on and off quickly. A lower switching rate, however, can potentially save a bit of power since large MOSFET transistors require more current as the switching rate increases. Thus, there is a tradeoff between switching speed and power requirements.

Moreover, since the voltage fluctuation during the switching operations in accordance with the invention can be as small as one battery cell voltage (e.g. 3.6V for Lithium Ion battery cells as compared to the 48V battery pack used in conventional small electric vehicles such as bicycles), the switching transients are smaller both in voltage, current, and torque. If a motor powered by a normal battery is controlled using PWM, there will usually be a large voltage spike whenever the PWM switch is open due to the inductive nature of the motor. In fact, when the switch is open a large voltage can develop causing a spark thereacross as the inductor tries to maintain the current flow. The provision of a variable voltage battery keeps the circuit from opening completely. The battery simply goes from one voltage to another, and part of the battery is always connected to the motor. This provides a continuous current path at all times, except when the voltage has to ramp down to zero. With the VVB, even when the voltage is ramped down to zero a current path can be provided by properly reconfiguring the battery. Therefore, the VVB based operation is much gentler, both for driving and for regenerative braking. Adding a filter capacitor as described hereinabove can help to some degree where a VVB is not used, but using the VVB results in better performance for a given size capacitor.

The reconfigurable battery also provides significant advantages over designs using an inverter (e.g. DC to DC converter), as such inverters suffer from significant conversion losses and introduce complexities when trying to charge the battery in a regenerative braking mode.

The reconfigurable battery can also be configured to "short-out" (i.e., bypass) a dead or weak battery cell so that the entire battery does not suffer a failure due to a single bad cell. Even multiple bad cells can be bypassed and the battery pack will still perform well, albeit at a reduced maximum voltage. An algorithm can be used to sniff out a weak or bad cell that does not maintain reasonable voltage or current during discharge or misbehaves during re-charging. As will be appreciated by those skilled in the art, such a feature would require current and voltage sensors and a suitable controller. Another algorithm that can be provided in accordance with the invention is one that provides load balancing to keep all the battery cells evenly charged during recharging or discharging.

The present invention employs the variable voltage reconfigurable battery of the Reconfigurable Battery Patent described above in connection with FIGS. 1a-6. As shown in FIGS. 7a-7c, the variable voltage battery 202 schematic (FIG. 7a) can be reduced to an equivalent diagram (FIG. 7b) which can be embodied in a VVB module 302 (FIG. 7c).

Figures 8A, 8B:
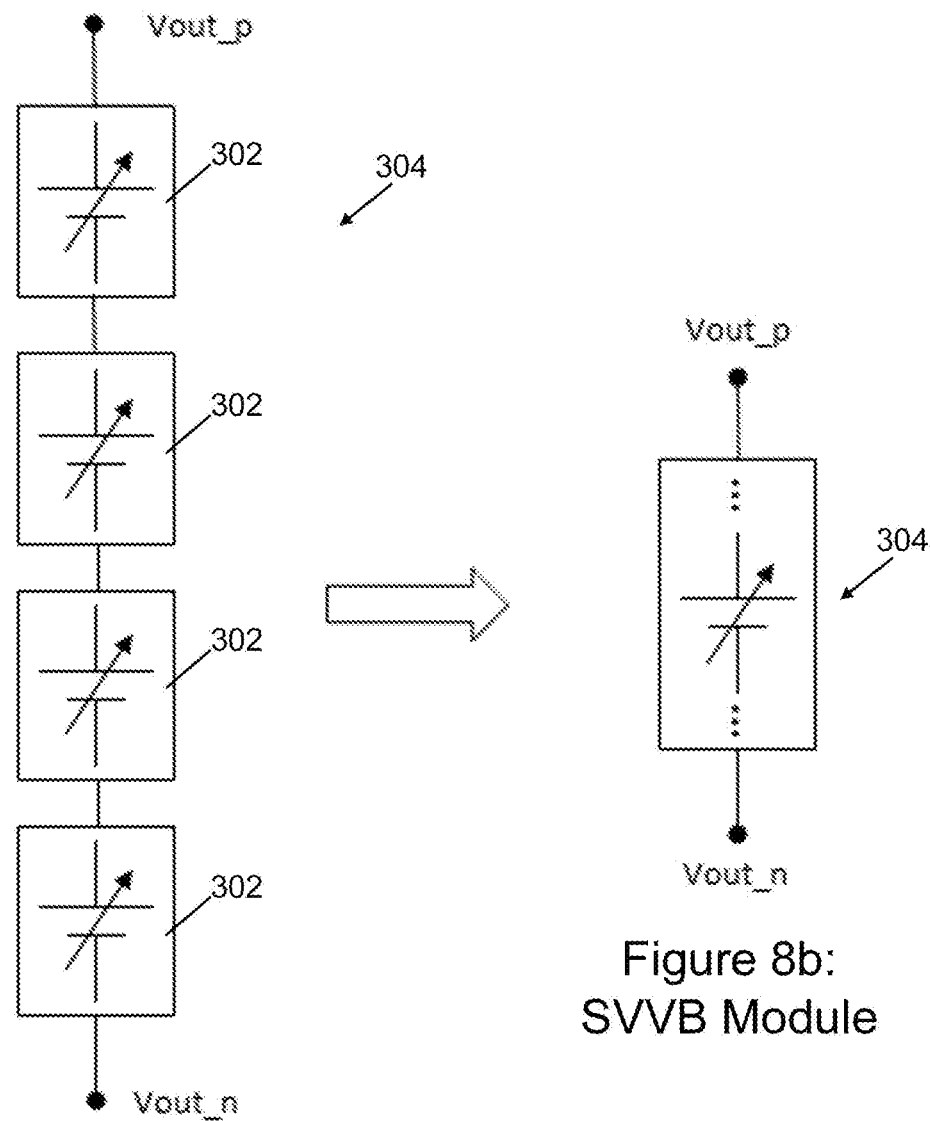
FIG. 8 (FIGS. 8a-8b) shows an example embodiment of a stacked variable voltage battery module in accordance with the present invention.

FIG. 8a shows a stacked arrangement of the VVB modules 302 in accordance with an example embodiment of the present invention to form a reconfigurable stacked VVB module 304 (SVVB). The VVB modules 302 are arranged in series with the Vout_p of one module 302 connected to the Vout_n of another module 302 connected thereto. A stacked VVB module 304 (which can also be denoted by the symbol as shown in FIG. 8b) may have any number of VVB modules 302 connected in series.

Due to the serial connection of the VVB modules 302, each VVB module 302 can be individually configured to provide a specific output voltage. For example, by reconfiguration of the switches of each VVB module 302, each VVB module 302 can produce:

full positive or negative voltages (sum of all battery cells in series);
partial positive or negative voltages (portion of the battery cells in series);
zero voltage (short: both Sw_n0 & Sw_p0 on, or both Sw_n1 & Sw_p1 on, etc., as shown in FIG. 7a example);
no voltage (open: all switches off or in the open position).

By configuring the switches of the individual VVB modules 302, the output of an SVVB module 304 can produce any voltage, up to a maximum of the voltage of all the battery cells of each module 302 in series. For example, opening and closing one or more of the processor-controlled switches of at least one of the VVB modules may provide a first switch configuration for providing a first overall output voltage between the first SVVB electrical output connection and the second SVVB electrical output connection. Opening and closing one or more of the processor-controlled switches of at least one of the VVB modules may provide a second switch configuration for providing a second overall output voltage between the first SVVB electrical output connection and the second SVVB electrical output connection.

Further, by reconfiguring the individual VVB modules 302 inside an SVVB module 304, the SVVB module 304 can produce a voltage output with reverse polarity, up to a maximum amplitude equal to the amplitude of all the battery cells of each module 302 in series. Further, the individual switches inside each VVB module 302 only need to handle small voltages. This provides increased efficiency at reduced cost.

The switches may comprise processor-controlled switches, including semiconductor switches (e.g., MOSFET or IGBT semiconductor switches) or the like. Those skilled in the art will appreciate that other types of switches (now known or to be developed) may be used in the implementation of various embodiments of the invention.

The use of multiple VVB modules 302 provides modularization and scalability. An SVVB module 304 can include any number of VVB modules 302, and each VVB module 302 may include any number of battery cells 200.

When recharging an SVVB module 304, charge balancing can be easily achieved. For example, some VVB modules 302 can be bypassed (by configuring the output voltage of the respective VVB modules to be bypassed to be 0) to recharge weaker VVB modules 302 first. If the recharging voltage exceeds a maximum voltage of an SVVB module 304, recharging may be stopped by making one of the VVB modules 302 go open circuit. Alternatively, a simple switch mode voltage regulator may be used to bring the charging current to a manageable level. The switching action can be controlled by a VVB module 302 itself if desired, reducing the need for a high voltage switching transistor for the voltage regulation.

Charge balancing may also be enabled within each VVB module 302. For example, a traditional charge balancing method can be used, per each battery cell 200, such as providing an additional switch and resistor across each battery cell 200 to discharge excess charge from each cell 200.

When discharging an SVVB module 304, depending on the voltage output needs, some of the VVB modules 302 can be bypassed. Power can be conserved on the weaker VVB modules 302 that have reduced capacity.

Recharging and discharging may occur on an AC waveform. By configuring the switches, the SVVB voltage can be continuously dynamically configured to either accept or produce an Alternating Current (AC) waveform. For example, an AC waveform may be accepted for charging one or more of the battery cells, and an AC waveform may be produced for discharging one or more of the battery cells. A small switching regulator can smooth out the voltage steps or current steps resulting from reconfiguring of the switches in the VVB modules 302.

The SVVB module 304 also enables partial failure mode operations where the switches are configured to bypass a failed VVB module 302 or a failed battery cell. For example, an entire VVB module 302 with a bad battery (shorted, open, or weak cells) can be bypassed. In such cases, the maximum SVVB output voltage will be reduced accordingly. In addition, each individual VVB module 302 can be configured (by selecting appropriate switch configurations) to bypass one or more bad cells, thereby producing lower potential output voltages but maintaining operation. Such an embodiment may require additional switches and processor control.

Figure 9:
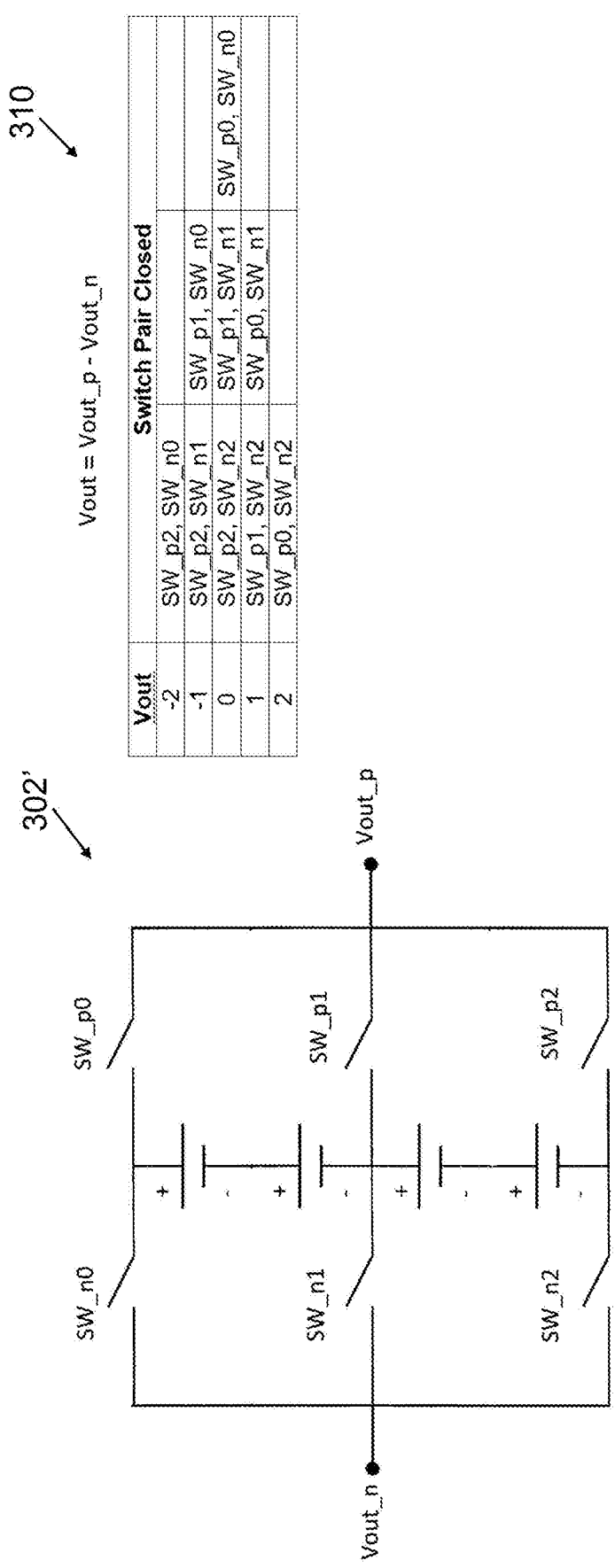
FIG. 9 shows an example implementation of an example embodiment of a variable voltage battery module in accordance with the present invention.

FIG. 9 shows an example of a practical application of the present invention such as an inverter, an energy storage system, or an uninterruptable power supply. In this case, FIG. 9 shows a single VVB module 302' with three positive and three negative output taps, connected respectively to common outputs Vout_n and Vout_p. Two battery cells are provided above a center output tap and two battery cells are provided below the center output tap, with three switches SW_n0, SW_n1, SW_n2 for connecting corresponding output taps to Vout_n and three switches SW_p0, SW_p1, SW_p2 for connecting corresponding output taps to Vout_p.

Although any number of cells could be connected in series between each pair of voltage taps, for example purposes the magnitude of the emitted output voltage will be referred to as 1 voltage unit. In the example shown, a maximum output voltage of +2 voltage units may be achieved by closing switches SW_p0 and SW_n2, while a maximum negative voltage (−2) may be achieved by closing switches SW_p2 and SW_n0. Intermediate voltages (+1, 0, −1) may be obtained by different switching pair combinations 310, as shown in table 310 included in FIG. 9.

It should be appreciated that although the FIG. 9 example shows two battery cells between each output tap pair, any number of battery cells may be provided between output taps, and/or additional output taps with corresponding switches may be provided. For example, 1-8 battery cells (or more) may be provided between each output tap/switch. Further, output taps/switches may be provided between each battery cell. The greater the number of output taps and/or battery cells that are provided, the greater the configuration options become. In practice, implementations with as few as 4 switches may be utilized.

Figure 10:
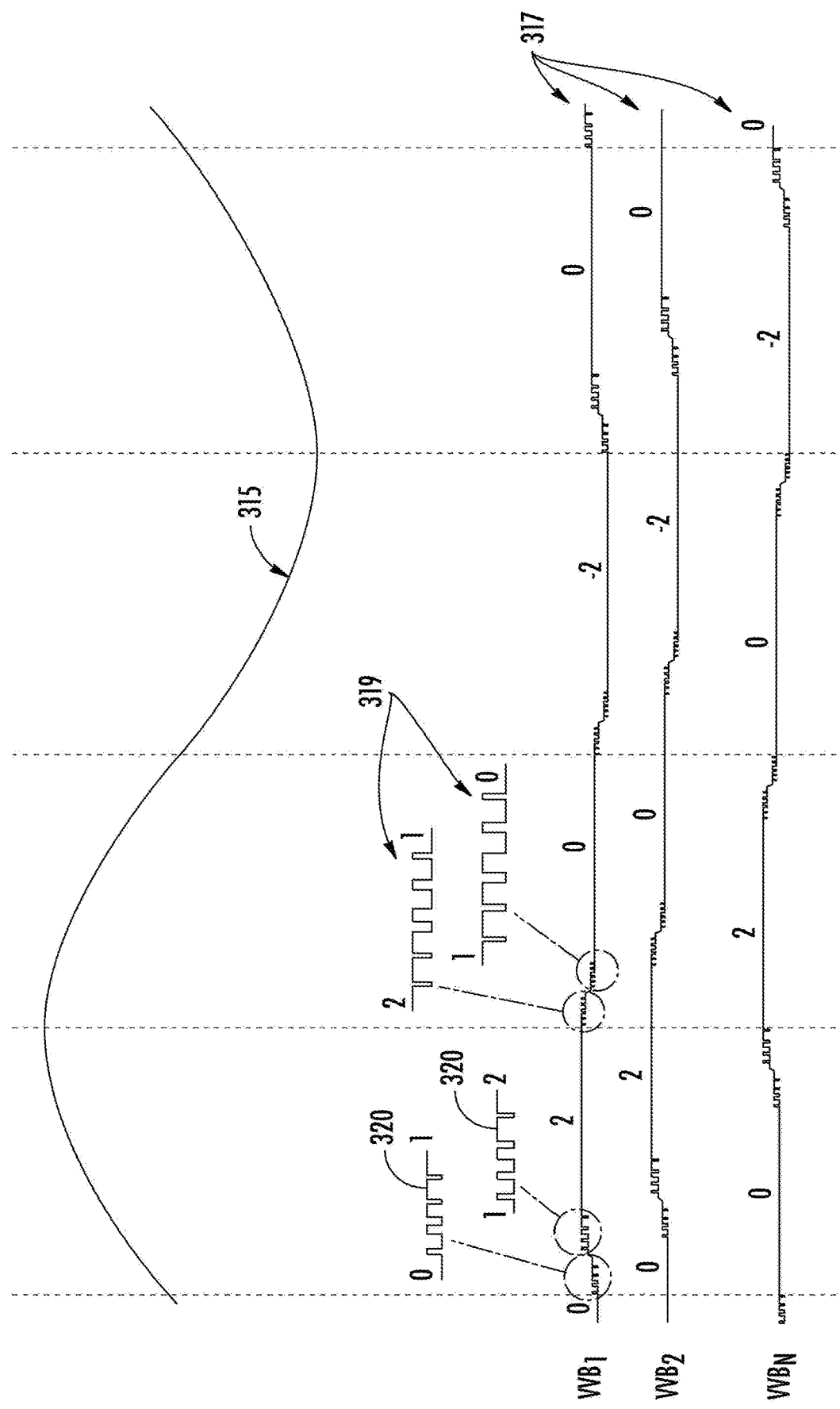
FIG. 10 shows example output waveforms achieved in connection with a stacked variable voltage batter module arrangement consisting of variable voltage battery modules in accordance with the FIG. 9 embodiment.

FIG. 10 shows the resulting waveform 315 of Vout (the difference between Vout_p and Vout_n) of an SVVB module comprised of a number of the VVB modules 302' of FIG. 9 arranged in series. The waveform 315 is comprised of the sum of the outputs (e.g., $VVB_1$, $VVB_2$, . . . $VVB_N$) of the individual VVB modules 302'. Each of the VVB modules 302' are configured to provide different outputs at different instances in time, as shown in the VVB waveforms 317, which, when summed, provide the sinusoidal waveform 315.

For example, to obtain VVB1, the switches of a first VVB module 302' will be configured to provide as a sequential output 0, 1, 2, 1, 0, −1, −2, −1, 0, etc. voltage units. To smooth out the changes in output and avoid sharp step-up or step-down in the output voltage from each VVB module 302', the switches may be modulated at each voltage change to provide a smoothing output waveform. For example, waveform 320 is representative of a smoothing waveform for positive voltage transitions (0 to 1, 1 to 2, −2 to −1, −1 to 0) and waveform 319 is representative of a smoothing waveform for negative voltage transitions (0 to −1, −1 to −2, 2 to 1, 1 to 0). For example, when changing from 0 to +1 voltage units, a switch configuration corresponding to an output of 0 is gradually turned off, while a switch configuration corresponding to an output of +1 is gradually turned on. As shown in table 310, any of three possible switch configurations can be used to produce an output of 0, and either of two possible switch configurations can be used to produce an output of +1. For example, if the output is initially maintained at 0 by closing SW_p1 and SW_n1, then the transition from 0 to +1 can be performed by turning off SW_p1 and turning on SW_p0, such that the two switches are never on at the same time. That is, switch SW_p1 of VVB module 302' may be cycled off and on repeatedly, with the switch "off" time progressively increasing, while at the same time, switch SW_p0 is cycled on and off repeatedly with the "on" time progressively increasing, until a constant +1 voltage units is provided, as represented by the waveform 320. Such switch modulation occurs at each voltage change, and can be achieved, for each voltage, by controlling the corresponding switch pair(s) combinations 310. In cases where the next desired output is 0, it may be advantageous to select the switch pair combination which is most similar to the current switch pair combination. This is because it is simpler to modulate two switches rather than four. In other cases, where the next desired output is +1 or −1 and the battery cells are being discharged, it may be advantageous to select the switch pair corresponding to the selection of battery cells currently having the highest state of charge. Similarly, if the next desired output is +1 or −1 and the battery cells are being charged, it may be advantageous to select the switch pair corresponding to the selection of battery cells currently having the lowest state of charge. These are useful methods for battery cell equalization within a VVB module.

Since the modulation pulses are confined to a single VVB module at a time, they are relatively small in amplitude and easily smoothed by providing a capacitive and/or inductive filtering element for voltage and/or current waveform filtering, as discussed above in connection with FIG. 4. The filtering element can be employed within the VVB module 302 or external to VVB module 302 but part of SVVB module 304.

The modulation may be achieved via a software algorithm implemented on the corresponding control processor(s) having PWM output capabilities. The result is a smooth transition between the output voltages of each VVB module 302'.

The output waveforms for VVB2, . . . VVBn are achieved in the same manner in a time-staggered fashion. Since the process of generating the combined output waveform 315 is distributed across multiple VVB modules 302, it should now be appreciated that the management of the various switches SW_ni and SW_pi is notably different than the management of the corresponding switches used in the single VVB discussed above in connection with FIGS. 1a-6. Since only a single SW_ni and a single SW_pi switch can be selected at a time within a single VVB, the switches would remain in the same state for short intervals if a single VVB was configured to produce a similar AC waveform. However, as can be seen from the example in FIG. 10 where multiple VVB modules 302 are stacked in series, once a transition step is completed, the corresponding switches SW_ni and SW_pi remain in the same state for a relatively long time interval (e.g., more than 4 ms if producing a 60 Hz sinusoidal waveform). This promotes better electrical and thermal efficiency, not only due to the reduced transition losses, but also due to the wider selection of low-cost, highly efficient switches meeting the reduced specification extremes associated with the stacked VVB module 304.

Figure 11A:
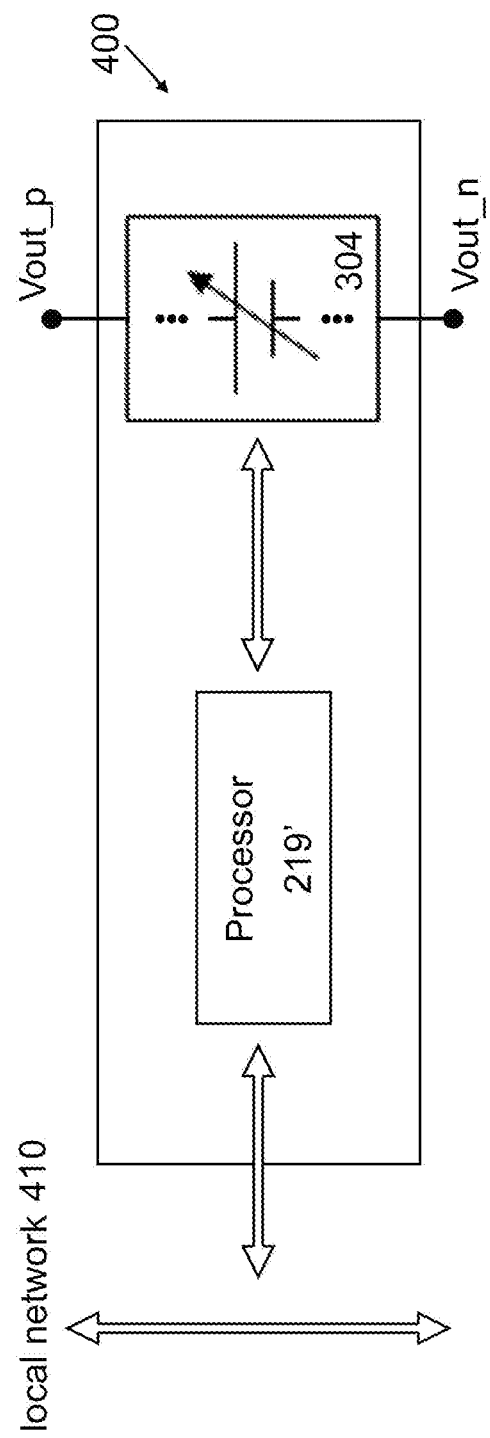
FIG. 11a shows an example embodiment of a stacked variable voltage battery module with single processor control in accordance with the present invention.
Figure 11B:
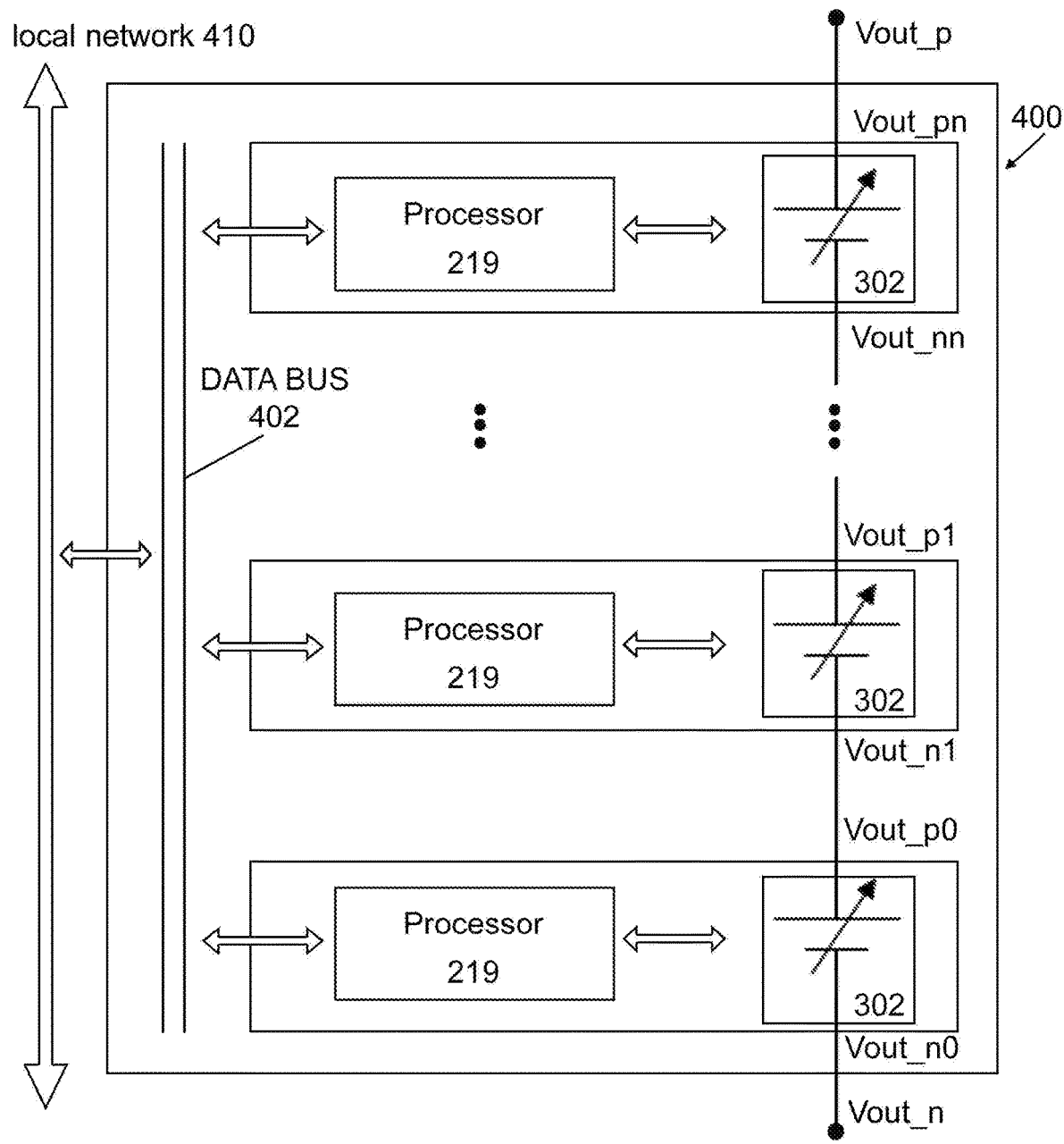
FIG. 11b shows an example embodiment of a stacked variable voltage battery module with distributed processor control in accordance with the present invention.

As shown for example in FIG. 11a, configurability (e.g., switching and output control) of the individual VVB modules 302 that make up a single SVVB module 304 can be controlled by a single main control processor 219' that manages the SVVB module 304. Alternatively, as shown in FIG. 11b, configurability of the individual VVB modules 302 can each be controlled by a local control processor 219 (e.g., processor 219 discussed above in connection with FIG. 6) connected to each VVB module 302. In such a distributed processing environment, each processor 219 communicates with other local processors 219 via data bus 402, or optionally with a main control processor 219' via data bus 402 and local network 410. In either case, the stacked VVB module 304 with single processor control shown in FIG. 11a or the stacked VVB module 304 with distributed processor control shown in FIG. 11b form a processor-controlled module 400 which is in communication with local network 410. It is worth noting that the communication path between different VVB modules 302 may need to be electrically isolated since the supply voltages are likely to be different. Those skilled in the art will realize that there are many ways to isolate circuits. For example, the local network 410 and data bus 402 could conform to a standard such as ethernet, which specifies the use of isolation transformers. Further, the control or communication by the main control processor 219' to the VVB modules 302 may be achieved thru voltage isolation mechanism, e.g. opto isolators, capacitive coupling, RF coupling, or the like.

Figure 12A:
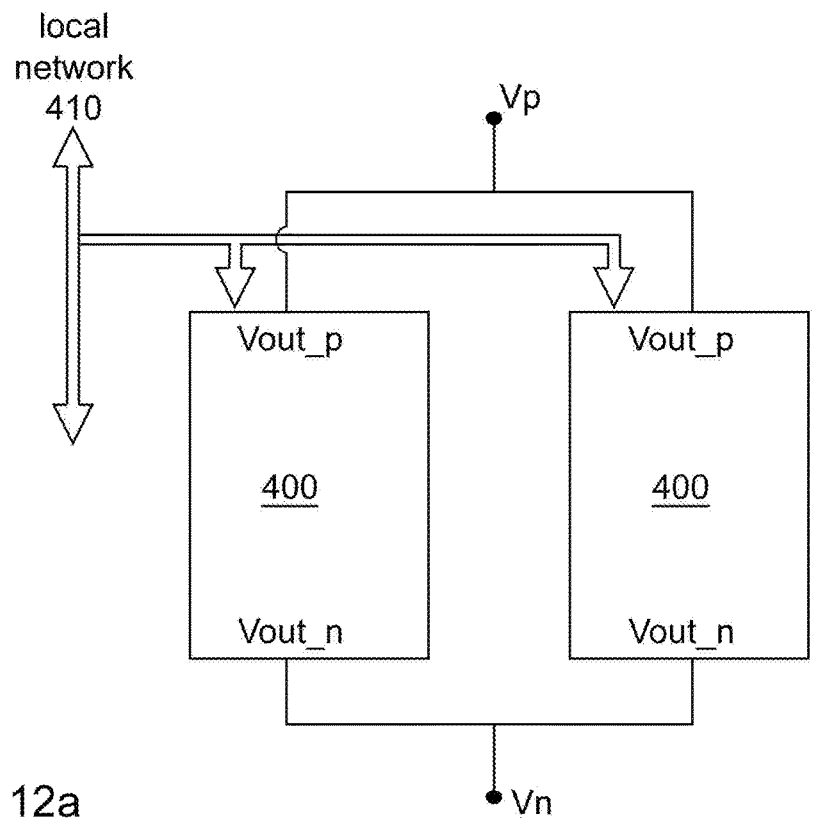
FIG. 12a shows an example embodiment of stacked variable voltage modules connected in parallel in accordance with the present invention.

It should also be appreciated that the SVVB modules 304 may be used in series and/or parallel. For example, FIG. 12a shows processor-controlled SVVB modules 400 connected in parallel in order to increase the output current range.

Figure 12B:
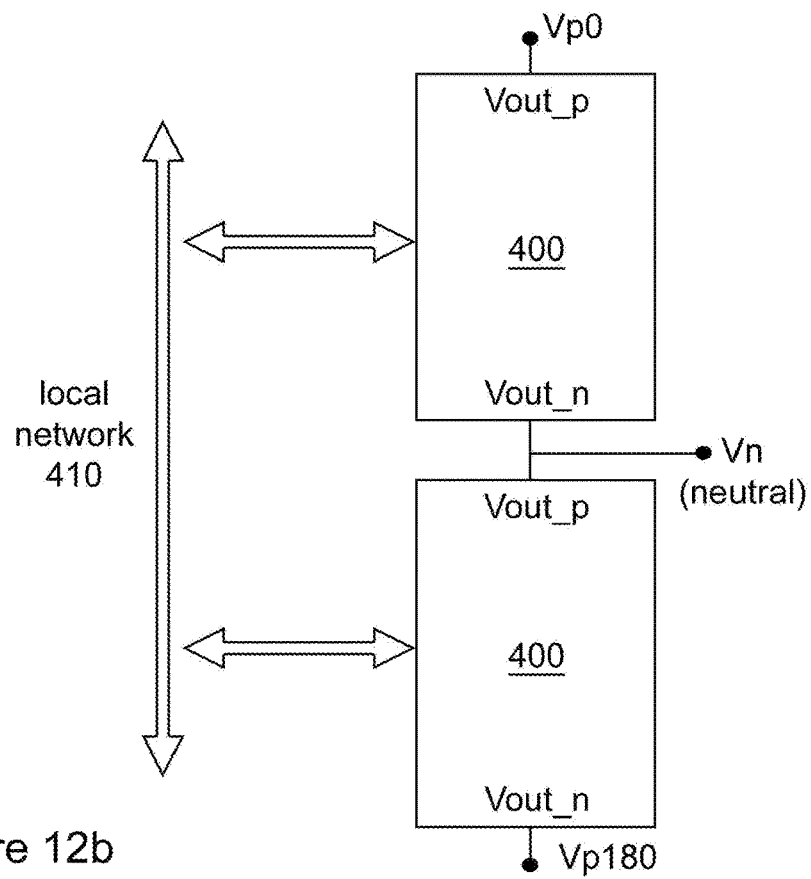
FIG. 12b shows an example embodiment of stacked variable voltage modules connected in series in accordance with the present invention.

FIG. 12b shows an example of processor-controlled SVVB modules 400 connected in series in order to increase the output voltage range. For example, if each of the processor-controlled SVVB modules 400 produces 120 VAC maximum and are locked in phase and frequency, then the combined voltage would be 240 VAC with the center tap (Vn) being the neutral. This configuration is compatible with most homes in the US.

FIG. 12c shows an example of multiple processor-controlled SVVB modules 400 connected to produce 3-phases of output. Each pair of series-connected processor-controlled SVVB modules 400 is locked to the same phase, and the phase of each of the three pairs of modules 400 is set to 0, 120, and 240 degrees respectively.

Note that one of the benefits of stacking SVVB modules 304 is modularization. For example, one might prefer a relatively small module size for compatibility with a particular light duty application, while still maintaining the option of scaling to meet the demands of heavier duty applications. As another example, it might simply be more practical to design an SVVB module 304 where the processor only needs to manage a limited number of VVB modules 302.

It should further be appreciated that the included embodiments discussed above describing a plurality of battery cells may also be interpreted as a plurality of battery banks or a plurality of batteries, without departing from the scope of the present invention. For example, each battery cell within a VVB module 302 described herein may consist of a single battery cell, or two or more battery cells in a series or parallel connection.

Figure 13:
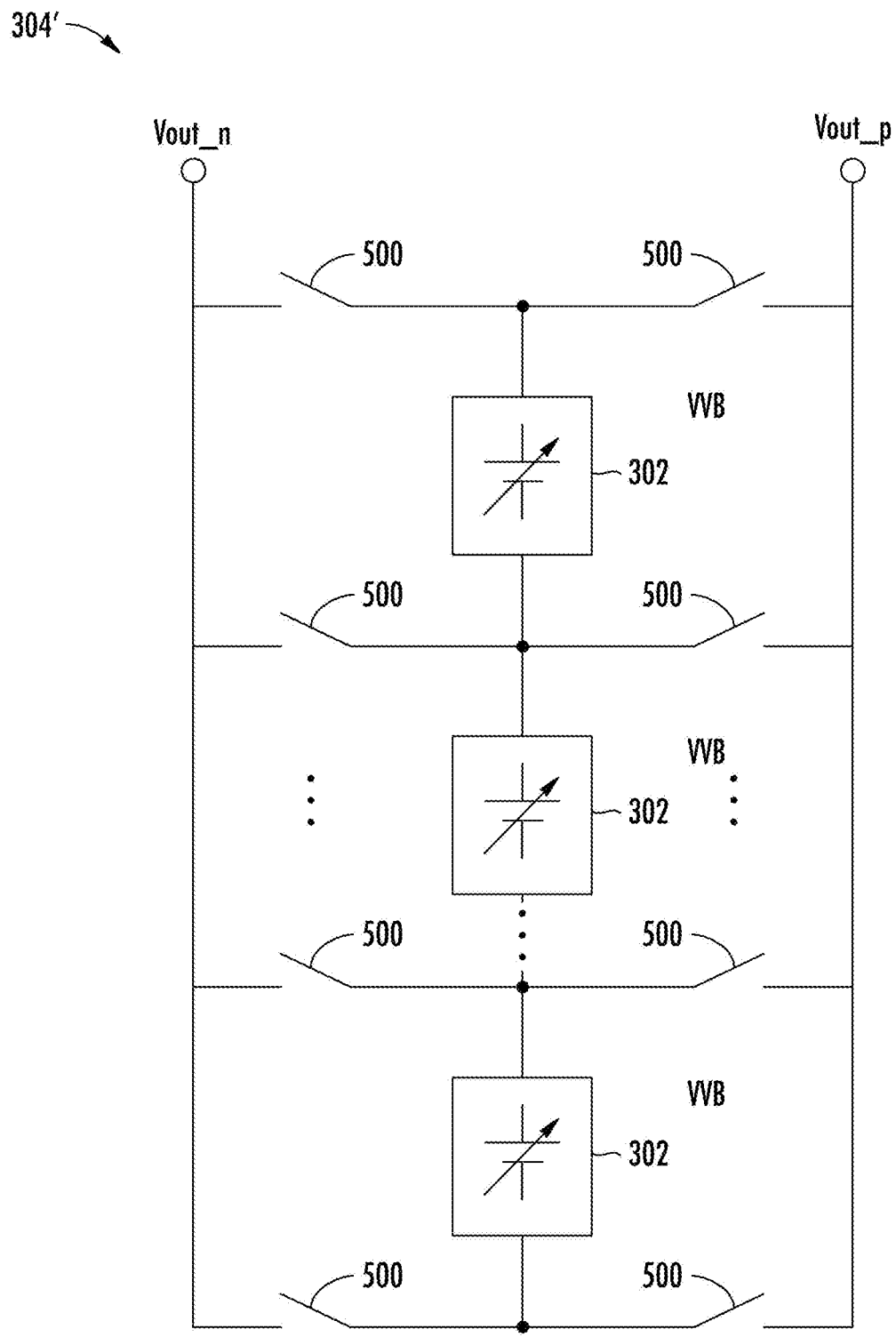
FIG. 13 shows an example embodiment of a stacked variable voltage battery module with switches between the variable voltage battery modules and the output connections in accordance with the present invention.

FIG. 13 shows a further example embodiment of an SVVB module 304' with additional processor-controlled switches 500 between each VVB module and the first SVVB electrical output connection, and between each VVB module and the second SVVB electrical output connection.

Figure 14:
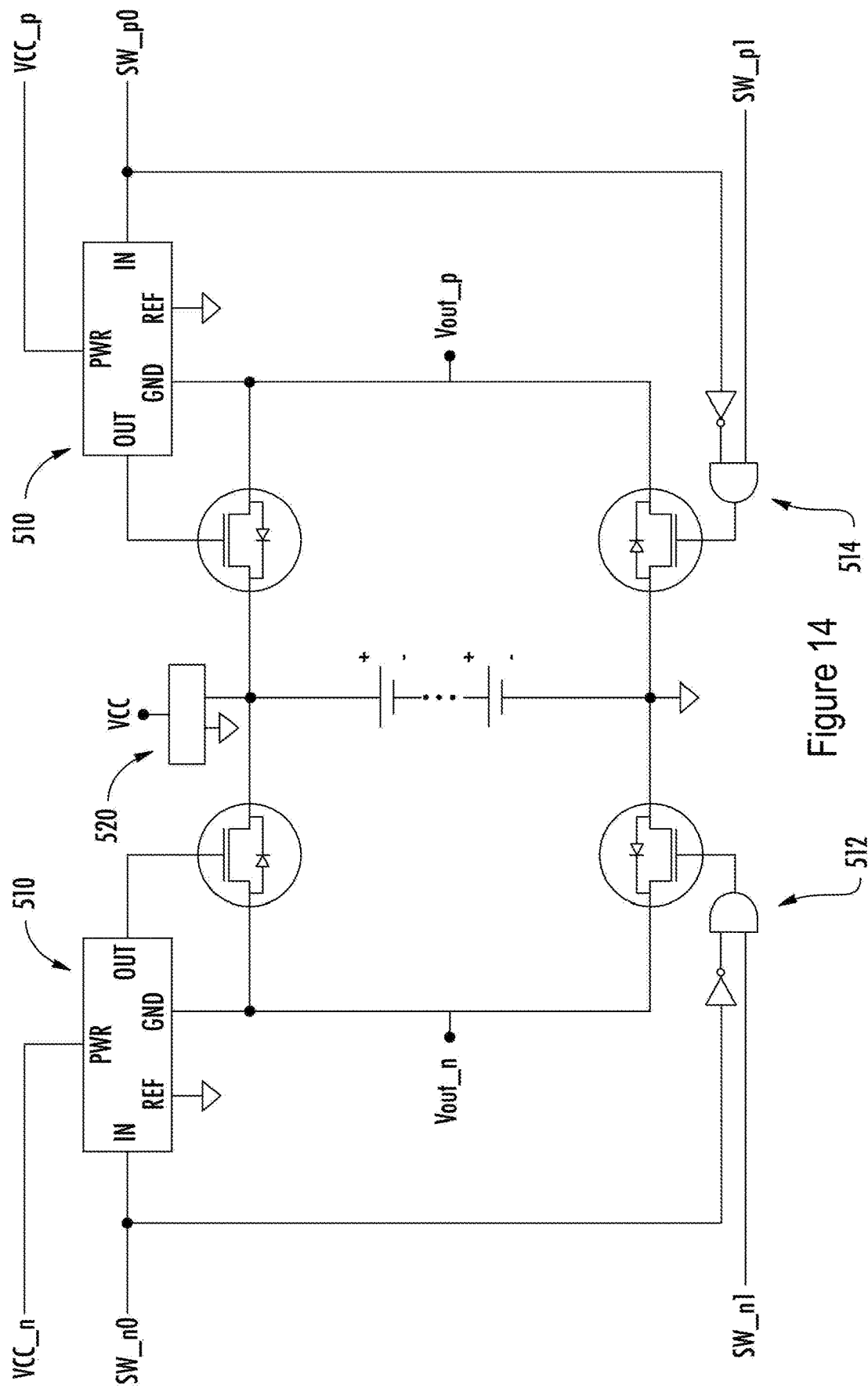
FIG. 14 shows an example implementation of a variable voltage battery module which employs semiconductor switches in accordance with the present invention.

FIG. 14 shows a further example embodiment of a VVB module, in particular a more detailed representation of the VVB in FIG. 9, where switches SW_n0, SW_p0, SW_n2, and SW_p2 are implemented using N-MOSFET semiconductors. In this example switches SW_n1 and SW_p1 are omitted, and SW_n2 and SW_p2 are renamed accordingly.

There is a complication in applying the high side control signals (SW_n0 and SW_p0) to the gate of the corresponding MOSFETs. The voltage at the gate needs to be in a suitable range when referenced to the voltage at the MOSFET source (Vout_n and Vout_p respectively). Different types of high-side or half bridge gate drive devices exist to solve this problem, but none are well suited to this application. These devices are either expensive, and/or they transition too slowly, and/or they require a minimum switching rate in order to operate. In this application, it is desirable to maintain a high-side switch in the ON state for relatively long time intervals.

A solution to this problem is shown in FIG. 14, where the gate voltage translation is performed by the two voltage translation sub-modules 510, each provided with a suitable ground reference voltage (GND) and a suitable supply voltage (PWR). The ground voltage for the left side voltage translation sub-module 510 is connected to Vout_n and the supply voltage of the sub-module 510 is connected to the supply voltage (VCC_n) originating from an adjacent VVB module. Similarly, the ground voltage to the right side voltage translation sub-module 510 is connected to Vout_p and the supply voltage for this sub-module 510 is connected to the supply voltage (VCC_p) originating from the adjacent VVB module on the right side.

Each VVB module includes means 520 for generating supply voltage VCC, which is used both internally by the VVB module in which it is located, and also by the voltage translation sub-modules in adjacent VVB modules. VCC can either be derived directly from the module battery cells as shown in FIG. 14, or alternatively, it could be supplied or derived from an external source.

Figure 15:
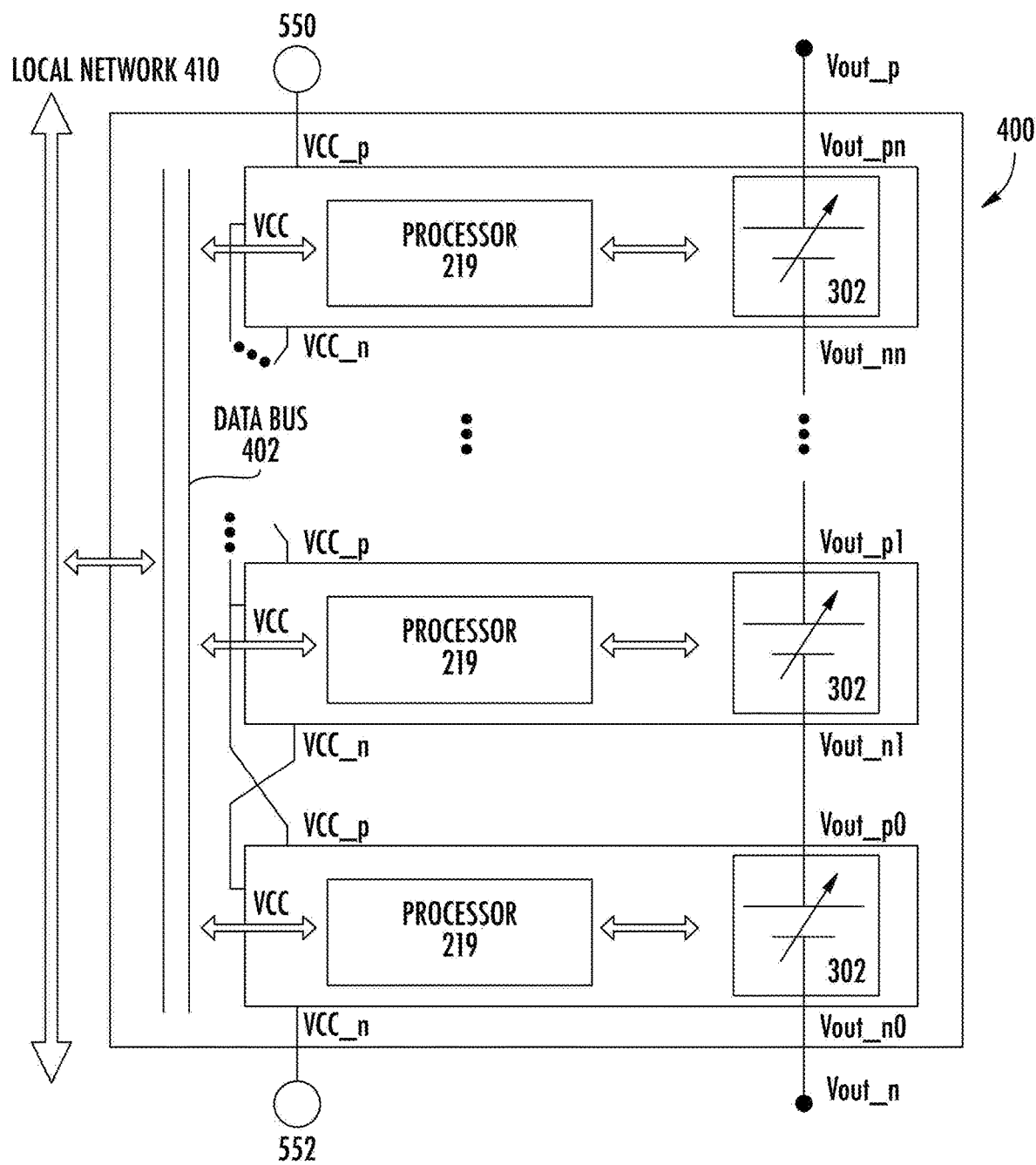
FIG. 15 shows an example embodiment of a stacked variable voltage battery module with distributed processor control and interconnection of semiconductor switch supply voltages in accordance with the present invention.

The interconnection of supply voltages between adjacent VVB modules is illustrated in FIG. 15, which is otherwise the same as FIG. 11b. Note that independent voltage sources 550 and 552 have been included to provide the supply voltages (VCC_p and VCC_n respectively) to the corresponding end modules.

The VVB module implementation shown in FIG. 14 includes protection against damage that would occur if both a low side and corresponding high side switch were to be turned on at the same time. In this case, logic gates 512 are used to prevent the first low side switch from turning on in cases where both SW_n0 and SW_n1 are set high, and additional logic gates 514 are used to prevent the second low side switch from turning on when both SW_p0 and SW_p1 are high.

A detailed implementation must also account for the transition delays that occur on all logic gates, MOSFET switches, and other semiconductors. For example, consider the transient condition where the logic value of SW_n1 is high while, at the same time, the logic value of SW_n0 is changing from high to low. The initial state corresponds to the case where the high side MOSFET is turned on while the low side MOSFET is turned off, since the INVERTER and AND gate logic are intended to prevent both MOSFETs from being on at the same time. Then after the transition is complete, the high side MOSFET would be turned off and the low side MOSFET would be turned on. However, during the transition, it is possible that both MOSFETs could be turned on at the same time, depending on whether the latency from the IN to OUT ports of the voltage translation sub-module exceeds the combined latency of the INVERTER and AND gate logic. One way to prevent this potential undesirable result is to derive a third logic value from the voltage sensed at the output (Vout_n or Vout_p) and then applying this logic signal to insure that the low side switch does not turn on until the output voltage drops below a suitable threshold.

Note that in FIG. 14 the voltage translation sub-modules 510 include an input (REF) connected to the ground reference point of the VVB module. This is the same ground reference assumed by the control signals SW_p0, SW_p1, SW_n0 and SW_n1.

Conveniently, there is never a need to turn on a high side switch when the supply voltage forwarded to the corresponding translation module is negative. The assumption is that each VVB module will either be configured to have the same polarity as adjacent units, or it will be configured to be in bypass mode.

Negative supply voltages occur when the adjacent switch pair in the adjacent VVB module is configured with the high side switch turned on and the low side switch turned off. But if the current VVB module is configured with the same polarity as this adjacent VVB module, then the switch pair having a negative supply voltage forwarded to its corresponding translation sub-module would need to be configured with the high side switch in the off state and the low side switch in the on state. Alternatively, the low side switch could be configured to toggle between the on and off states, in order to implement a gradual transition between two different output voltages.

The voltage translation sub-module insures that the high side switch is turned off when the forwarded supply voltage is negative (when PWR is less than GND).

A VVB module can be configured into bypass mode at any time by turning on both low side switches while leaving both high side switches in the off state. That is, SW_n1 and SW_p1 would both be set high and SW_n0 and SW_p0 would both be set low.

Although the invention has been described in connection with various illustrated embodiments, numerous modifications and adaptations may be made thereto without departing from the spirit and scope of the invention as set forth in the claims.

What is claimed is:

1. A reconfigurable stacked variable voltage battery (SVVB) module arrangement, comprising:
    a first SVVB electrical output connection;
    a second SVVB electrical output connection; and
    at least two variable voltage battery (VVB) modules arranged in a series configuration between the first SVVB electrical output connection and the second SVVB electrical output connection;
    each VVB module comprising:
        at least one battery cell;
        processor-controlled switches adapted to vary the output voltage of each of the VVB modules; and
        a local control processor internal to each VVB module for controlling the processor-controlled switches of the corresponding VVB module;
    wherein an overall output voltage between the first SVVB electrical output connection and the second SVVB electrical output connection is configurable via the processor-controlled switches of the VVB modules.

2. The reconfigurable stacked variable voltage battery module arrangement in accordance with claim 1, wherein the processor-controlled switches of each VVB modules comprise:
    at least one processor-controlled switch electrically connected between a first voltage pole of the at least one battery cell and a first VVB electrical output connection; and
    at least one processor-controlled switch electrically connected between a second voltage pole of the at least one battery cell and a second VVB electrical output connection.

3. The reconfigurable stacked variable voltage battery module arrangement in accordance with claim 2, wherein the processor-controlled switches are adapted to electrically reconfigure the corresponding VVB module by selectively coupling or uncoupling the first voltage pole of the at least one battery cell with the first VVB electrical output connection and the second voltage pole of the at least one battery cell with the second VVB electrical output connection to provide a reconfigurable battery output voltage between the first VVB electrical output connection and the second VVB electrical output connection of the corresponding VVB module.

4. The reconfigurable stacked variable voltage battery module arrangement in accordance with claim 1, wherein:
    the at least one battery cell comprises at least two battery cells connected in a series configuration.

5. The reconfigurable stacked variable voltage battery module arrangement in accordance with claim 4, wherein:
    the processor-controlled switches are arranged between each of the series connected battery cells and the first electrical output connection and between each of the series connected battery cells and the second electrical output connection.

6. The reconfigurable stacked variable voltage battery module arrangement in accordance with claim 1, further comprising:
    a main control processor in communication with the local control processors for controlling the processor-controlled switches of each variable voltage battery module.

7. The reconfigurable stacked variable voltage battery module arrangement in accordance with claim 1, wherein:
    the at least two VVB modules comprises N VVB modules, wherein N is greater than two;
    the at least one battery cell of a corresponding VVB module comprises M battery cells, where M is greater than one; and
    the number of battery cells of each of the VVB modules may be different.

8. The reconfigurable stacked variable voltage battery module arrangement in accordance with claim 1, wherein:
    the processor-controlled switches are configurable such that the overall output voltage ranges from an overall maximum voltage equal to a sum of maximum positive voltages of each VVB module to an overall maximum negative voltage equal to a sum of maximum negative voltages of each VVB module.

9. The reconfigurable stacked variable voltage battery module arrangement in accordance with claim 1, wherein the processor-controlled switches are selectively configurable to provide a VVB module output of at least one of zero voltage, positive voltage, negative voltage, or an open circuit for each of the at least two VVB modules.

10. The reconfigurable stacked variable voltage battery module arrangement in accordance with claim 1, wherein the processor-controlled switches are configured by one of pulse width modulation signaling or pulse density modulation signaling.

11. The reconfigurable stacked variable voltage battery module in accordance with claim 1, wherein the processor-controlled switches are continuously reconfigured in order to generate an AC waveform between the first and second electrical output connections.

12. The reconfigurable stacked variable voltage battery module arrangement in accordance with claim 1, wherein the processor-controlled switches are configurable to at least one of: produce an AC waveform; accept an AC waveform; produce an AC waveform for discharging one or more of the battery cells; or accept an AC waveform for charging one or more of the battery cells.

13. The reconfigurable stacked variable voltage battery module arrangement in accordance with claim 1, wherein the processor-controlled switches are configurable to bypass a failed VVB module or a failed battery cell within the corresponding VVB module.

14. The reconfigurable stacked variable voltage battery module arrangement in accordance with claim 1, further comprising at least one of an inductive or a capacitive element for at least one of voltage and current waveform filtering.

15. The reconfigurable stacked variable voltage battery module arrangement in accordance with claim 1, further comprising additional processor-controlled switches between:
    at least one of the at least two VVB modules and the first SVVB electrical output connection; and
    at least one of the at least two VVB modules and the second SVVB electrical output connection.

16. The reconfigurable stacked variable voltage battery module arrangement in accordance with claim 1, further comprising additional processor-controlled switches between:

each VVB module and the first SVVB electrical output connection; and each VVB module and the second SVVB electrical output connection.

17. The reconfigurable stacked variable voltage battery module arrangement in accordance with claim 1, wherein two or more SVVB modules are arranged in series to at least one of: (a) increase voltage output range, and (b) provide three or more electrical output connections.

18. The reconfigurable stacked variable voltage battery module arrangement in accordance with claim 1, wherein two or more SVVB modules are arranged in parallel to increase current output range.

19. The reconfigurable stacked voltage variable battery module arrangement of claim 1, wherein the processor-controlled switches comprise semiconductor switches.

20. The reconfigurable stacked voltage variable battery module arrangement of claim 19, wherein:
    one or more of the at least two VVB modules include at least one high side MOSFET semiconductor switch coupled to a voltage translation sub-module for setting the switching state; and
    one or more of the at least two VVB modules include a supply voltage source for supplying voltage to a voltage translation sub-module in at least one adjacent VVB module.

21. A method for reconfiguring a stacked variable voltage battery (SVVB) module arrangement, the SVVB module arrangement comprising:
    a first SVVB electrical output connection;
    a second SVVB electrical output connection; and
    at least two variable voltage battery (VVB) modules arranged in a series configuration between the first SVVB electrical output connection and the second SVVB electrical output connection;
    each VVB module comprising:
        at least one battery cell;
        processor-controlled switches adapted to vary the output voltage of each of the VVB modules; and
        a local control processor internal to each VVB module for controlling the processor-controlled switches of the corresponding VVB module;
    wherein the method comprises:
    at least one of opening and closing one or more of the processor-controlled switches of at least one of the at least two VVB modules to provide a first switch configuration for providing a first overall output voltage between the first SVVB electrical output connection and the second SVVB electrical output connection; and
    at least one of opening and closing one or more of the processor-controlled switches of at least one of the at least two VVB modules to provide a second switch configuration for providing a second overall output voltage between the first SVVB electrical output connection and the second SVVB electrical output connection.

* * * * *